(12) United States Patent
Senftleber et al.

(10) Patent No.: US 10,956,459 B2
(45) Date of Patent: *Mar. 23, 2021

(54) PREDICTING PERFORMANCE OF CONTENT AND ELECTRONIC MESSAGES AMONG A SYSTEM OF NETWORKED COMPUTING DEVICES

(71) Applicant: Spredfast, Inc., Austin, TX (US)

(72) Inventors: Michael Senftleber, Driftwood, TX (US); Christopher Kerns, Austin, TX (US); Marc Schriftman, Austin, TX (US)

(73) Assignee: Spredfast, Inc., Austin, TX (US)

( * ) Notice: Subject to any disclaimer, the term of this patent is extended or adjusted under 35 U.S.C. 154(b) by 29 days.

This patent is subject to a terminal disclaimer.

(21) Appl. No.: 16/458,183

(22) Filed: Jun. 30, 2019

(65) Prior Publication Data

US 2020/0051120 A1 Feb. 13, 2020

Related U.S. Application Data

(63) Continuation of application No. 15/782,642, filed on Oct. 12, 2017, now Pat. No. 10,346,449.

(51) Int. Cl.
*G06F 16/31* (2019.01)
*H04L 12/58* (2006.01)
(Continued)

(52) U.S. Cl.
CPC .......... *G06F 16/313* (2019.01); *G06F 40/247* (2020.01); *G06F 40/279* (2020.01);
(Continued)

(58) Field of Classification Search
CPC ......... H04L 51/20; H04L 51/32; H04L 51/34; H04L 51/36; H04L 51/063; G06F 16/313; G06Q 30/0246
See application file for complete search history.

(56) References Cited

U.S. PATENT DOCUMENTS 6,041,311 A 3/2000 Chislenko et al.
6,146,026 A 11/2000 Ushiku
(Continued)

FOREIGN PATENT DOCUMENTS

CN 102054033 A 5/2011
CN 103177095 B 12/2015
(Continued)

OTHER PUBLICATIONS

Dinh, Khanh Q., Notice of Allowance and Fee(s) Due dated Oct. 29, 2019 for U.S. Appl. No. 15/877,379.
(Continued)

*Primary Examiner* — Huyen X Vo
(74) *Attorney, Agent, or Firm* — Kokka & Backus, PC

(57) ABSTRACT

Various embodiments relate generally to data science and data analysis, computer software and systems, and control systems to provide a platform to facilitate implementation of an interface, and, more specifically, to a computing and data storage platform that implements specialized logic to predict effectiveness of content in electronic messages as a function, for example, modifiable portions of the content. In some examples, a method may include receiving data signals to cause formation of an electronic message, determining a component of the electronic message, identifying one or more message performance criteria, characterizing the component to identify a component attribute, predicting the component attribute matches at least one of the message performance criteria, and transmitting the electronic message.

20 Claims, 15 Drawing Sheets

(51) Int. Cl.
  *G06F 40/247* (2020.01)
  *G06F 40/279* (2020.01)
  *G06Q 30/02* (2012.01)
(52) U.S. Cl.
  CPC ....... *G06Q 30/0246* (2013.01); *H04L 51/063* (2013.01); *H04L 51/20* (2013.01); *H04L 51/34* (2013.01)

(56) References Cited

U.S. PATENT DOCUMENTS

| | | |
|---|---|---|
| 6,385,611 B1 | 5/2002 | Cardona |
| 6,684,239 B1 | 1/2004 | Flepp et al. |
| 6,742,032 B1 | 5/2004 | Castellani et al. |
| 6,871,232 B2 | 3/2005 | Curie et al. |
| 7,032,030 B1 | 4/2006 | Codignotto |
| 7,222,156 B2 | 5/2007 | Gupta et al. |
| 7,409,710 B1 | 8/2008 | Uchil et al. |
| 7,606,865 B2 | 10/2009 | Kumar et al. |
| 7,644,057 B2 | 1/2010 | Nelken et al. |
| 7,702,541 B2 | 4/2010 | Black et al. |
| 7,725,492 B2 | 5/2010 | Sittig et al. |
| 7,751,620 B1 | 7/2010 | Cosoi |
| 7,756,926 B2 | 7/2010 | Tseng et al. |
| 7,818,758 B2 | 10/2010 | Bonet et al. |
| 7,979,369 B2 | 7/2011 | Grenier et al. |
| 8,006,187 B1 | 8/2011 | Bailey et al. |
| 8,027,931 B2 | 9/2011 | Kalaboukis |
| 8,082,308 B1 | 12/2011 | Filev |
| 8,131,745 B1 | 3/2012 | Hoffman et al. |
| 8,171,128 B2 | 5/2012 | Zuckerberg et al. |
| 8,200,527 B1 | 6/2012 | Thompson et al. |
| 8,225,376 B2 | 7/2012 | Zuckerberg et al. |
| 8,286,154 B2 | 10/2012 | Kaakani et al. |
| 8,321,300 B1 | 11/2012 | Bockius et al. |
| 8,412,657 B2 | 4/2013 | Grenier et al. |
| 8,437,369 B2 | 5/2013 | Shaikli |
| 8,505,069 B1 | 8/2013 | Solodovnikov et al. |
| 8,606,792 B1 | 12/2013 | Jackson et al. |
| 8,615,442 B1 | 12/2013 | Kapur et al. |
| 8,752,041 B2 | 6/2014 | Akiyoshi et al. |
| 8,769,417 B1 | 7/2014 | Robinson et al. |
| 8,825,515 B1 | 9/2014 | Hanson |
| 8,886,580 B2 | 11/2014 | Grenier et al. |
| 8,892,524 B1 | 11/2014 | Lee et al. |
| 8,972,428 B2 | 3/2015 | Dicker et al. |
| 9,021,361 B1 | 4/2015 | Pettinati et al. |
| 9,105,044 B2 | 8/2015 | Wu |
| 9,131,382 B1 | 9/2015 | Johns |
| 9,141,997 B2 | 9/2015 | Gaedcke et al. |
| 9,143,478 B2 | 9/2015 | Ramaswamy |
| 9,229,702 B1 | 1/2016 | Kapulkin et al. |
| 9,282,098 B1 | 3/2016 | Hitchcock et al. |
| 9,311,683 B1 | 4/2016 | Saylor et al. |
| 9,338,186 B2 | 5/2016 | Wollenstein et al. |
| 9,378,295 B1 | 6/2016 | Marra et al. |
| 9,483,802 B2 | 11/2016 | Gaedcke et al. |
| 9,501,746 B2 | 11/2016 | Prakash |
| 9,509,742 B2 | 11/2016 | Gordon |
| 9,519,723 B2 | 12/2016 | Lorenz et al. |
| 9,596,206 B2 | 3/2017 | Bueno et al. |
| 9,619,531 B2 | 4/2017 | Wu |
| 9,756,098 B2 | 9/2017 | Kazerani et al. |
| 9,800,639 B2 | 10/2017 | Gordon |
| 9,953,063 B2 | 4/2018 | Spasojevic et al. |
| 10,084,838 B2 | 9/2018 | Gordon et al. |
| 10,142,386 B2 | 11/2018 | Gordon |
| 10,264,042 B2 | 4/2019 | Gordon |
| 10,284,723 B1 | 5/2019 | Neuer, III et al. |
| 2001/0025253 A1 | 9/2001 | Heintz et al. |
| 2001/0042087 A1 | 11/2001 | Kephart et al. |
| 2001/0047290 A1 | 11/2001 | Petras et al. |
| 2002/0010746 A1 | 1/2002 | Jilk et al. |
| 2002/0049793 A1 | 4/2002 | Okumura et al. |
| 2002/0070953 A1 | 6/2002 | Barg et al. |
| 2002/0105545 A1 | 8/2002 | Carter et al. |
| 2002/0144156 A1 | 10/2002 | Copeland |
| 2003/0005103 A1 | 1/2003 | Narad et al. |
| 2003/0028525 A1 | 2/2003 | Santos et al. |
| 2003/0078959 A1 | 4/2003 | Yeung et al. |
| 2003/0128203 A1 | 7/2003 | Marshall et al. |
| 2003/0135565 A1 | 7/2003 | Estrada |
| 2003/0225850 A1 | 12/2003 | Teague |
| 2004/0049673 A1 | 3/2004 | Song et al. |
| 2004/0133697 A1 | 7/2004 | Mamaghani et al. |
| 2004/0174397 A1 | 9/2004 | Cereghini et al. |
| 2005/0060643 A1 | 3/2005 | Glass et al. |
| 2005/0132348 A1 | 6/2005 | Meulemans et al. |
| 2005/0206644 A1 | 9/2005 | Kincaid |
| 2006/0010215 A1 | 1/2006 | Clegg et al. |
| 2006/0036685 A1 | 2/2006 | Canning et al. |
| 2006/0129602 A1 | 6/2006 | Witriol et al. |
| 2006/0143307 A1 | 6/2006 | Codignotto |
| 2006/0155581 A1 | 7/2006 | Eisenberger et al. |
| 2006/0206578 A1 | 9/2006 | Heidloff et al. |
| 2006/0294196 A1 | 12/2006 | Feirouz et al. |
| 2007/0083536 A1 | 4/2007 | Darnell et al. |
| 2007/0136354 A1 | 6/2007 | Chen |
| 2007/0171716 A1 | 7/2007 | Wright et al. |
| 2007/0226177 A1 | 9/2007 | Barsness et al. |
| 2007/0282800 A1 | 12/2007 | England et al. |
| 2007/0286528 A1 | 12/2007 | Podilchuk |
| 2008/0005284 A1 | 1/2008 | Ungar et al. |
| 2008/0033776 A1 | 2/2008 | Marchese |
| 2008/0034058 A1 | 2/2008 | Korman et al. |
| 2008/0040673 A1 | 2/2008 | Zuckerberg et al. |
| 2008/0103906 A1 | 5/2008 | Singh |
| 2008/0109245 A1 | 5/2008 | Gupta |
| 2008/0109491 A1 | 5/2008 | Gupta |
| 2008/0120379 A1 | 5/2008 | Malik |
| 2008/0126476 A1 | 5/2008 | Nicholas et al. |
| 2008/0133488 A1 | 6/2008 | Bandaru et al. |
| 2008/0178125 A1 | 7/2008 | Elsbree et al. |
| 2008/0189406 A1 | 8/2008 | Shen |
| 2008/0215591 A1 | 9/2008 | Howard et al. |
| 2008/0221870 A1 | 9/2008 | Attardi et al. |
| 2008/0225848 A1 | 9/2008 | Pilon et al. |
| 2008/0263603 A1 | 10/2008 | Murray et al. |
| 2008/0294680 A1 | 11/2008 | Powell et al. |
| 2008/0306830 A1 | 12/2008 | Lasa et al. |
| 2009/0013043 A1 | 1/2009 | Tan |
| 2009/0043852 A1 | 2/2009 | Weir et al. |
| 2009/0089657 A1 | 4/2009 | Davis |
| 2009/0106080 A1 | 4/2009 | Carrier et al. |
| 2009/0132311 A1 | 5/2009 | Klinger et al. |
| 2009/0138472 A1 | 5/2009 | MacLean |
| 2009/0144723 A1 | 6/2009 | Hartin et al. |
| 2009/0157667 A1 | 6/2009 | Brougher et al. |
| 2009/0157708 A1 | 6/2009 | Bandini et al. |
| 2009/0157899 A1 | 6/2009 | Gagliardi et al. |
| 2009/0158265 A1 | 6/2009 | Davis et al. |
| 2009/0177670 A1 | 7/2009 | Grenier et al. |
| 2009/0181649 A1 | 7/2009 | Bull et al. |
| 2009/0210282 A1 | 8/2009 | Elenbaas et al. |
| 2009/0249451 A1 | 10/2009 | Su et al. |
| 2009/0292608 A1 | 11/2009 | Polachek |
| 2009/0292722 A1 | 11/2009 | Ayloo |
| 2009/0300036 A1 | 12/2009 | Nagasaki |
| 2010/0082503 A1 | 4/2010 | Kantak et al. |
| 2010/0106730 A1 | 4/2010 | Aminian et al. |
| 2010/0119053 A1 | 5/2010 | Goeldi |
| 2010/0121707 A1 | 5/2010 | Goeldi |
| 2010/0121843 A1 | 5/2010 | Goeldi |
| 2010/0153516 A1 | 6/2010 | Weinberg et al. |
| 2010/0169148 A1 | 7/2010 | Oberhofer et al. |
| 2010/0205663 A1 | 8/2010 | Ward et al. |
| 2010/0223341 A1 | 9/2010 | Manolescu et al. |
| 2010/0246797 A1 | 9/2010 | Chavez et al. |
| 2010/0250683 A1 | 9/2010 | Hoyne et al. |
| 2010/0274732 A1 | 10/2010 | Grinchenko et al. |
| 2010/0281258 A1 | 11/2010 | Andress et al. |
| 2010/0287512 A1 | 11/2010 | Gan et al. |
| 2010/0306122 A1 | 12/2010 | Shaffer |
| 2010/0312769 A1 | 12/2010 | Bailey et al. |

(56) References Cited

U.S. PATENT DOCUMENTS

| | | |
|---|---|---|
| 2011/0004922 A1 | 1/2011 | Bono et al. |
| 2011/0055217 A1 | 3/2011 | Kamel et al. |
| 2011/0055264 A1 | 3/2011 | Sundelin et al. |
| 2011/0077988 A1 | 3/2011 | Cates et al. |
| 2011/0113041 A1 | 5/2011 | Hawthorne et al. |
| 2011/0119593 A1 | 5/2011 | Jacobson et al. |
| 2011/0125826 A1 | 5/2011 | Erhart et al. |
| 2011/0144801 A1 | 6/2011 | Selker et al. |
| 2011/0153603 A1 | 6/2011 | Adiba et al. |
| 2011/0197146 A1 | 8/2011 | Goto et al. |
| 2011/0212430 A1 | 9/2011 | Smithmier et al. |
| 2011/0219087 A1 | 9/2011 | Jorasch et al. |
| 2011/0246513 A1 | 10/2011 | Covannon et al. |
| 2011/0283366 A1 | 11/2011 | Kwon et al. |
| 2011/0289574 A1 | 11/2011 | Hull et al. |
| 2012/0036080 A1 | 2/2012 | Singer et al. |
| 2012/0054135 A1 | 3/2012 | Salaka et al. |
| 2012/0076367 A1 | 3/2012 | Tseng |
| 2012/0077158 A1 | 3/2012 | Jastrzembski et al. |
| 2012/0089706 A1 | 4/2012 | Collins et al. |
| 2012/0095861 A1 | 4/2012 | Feng et al. |
| 2012/0102021 A1 | 4/2012 | Hill et al. |
| 2012/0117059 A1 | 5/2012 | Bailey et al. |
| 2012/0158632 A1 | 6/2012 | Grenier et al. |
| 2012/0195422 A1 | 8/2012 | Famous |
| 2012/0208568 A1 | 8/2012 | Cooley |
| 2012/0232953 A1 | 9/2012 | Custer |
| 2012/0254321 A1 | 10/2012 | Lindsay et al. |
| 2012/0265806 A1 | 10/2012 | Blanchflower et al. |
| 2012/0271729 A1 | 10/2012 | Vincelette et al. |
| 2012/0284155 A1 | 11/2012 | Holten et al. |
| 2012/0290605 A1 | 11/2012 | Ickman et al. |
| 2012/0303659 A1 | 11/2012 | Erhart et al. |
| 2012/0317198 A1 | 12/2012 | Patton et al. |
| 2013/0007121 A1 | 1/2013 | Fontenot et al. |
| 2013/0018957 A1 | 1/2013 | Parnaby et al. |
| 2013/0024522 A1 | 1/2013 | Pierre et al. |
| 2013/0050747 A1 | 2/2013 | Cok et al. |
| 2013/0066876 A1 | 3/2013 | Raskino et al. |
| 2013/0110946 A1 | 5/2013 | Bradshaw |
| 2013/0116044 A1 | 5/2013 | Schwartz |
| 2013/0138428 A1 | 5/2013 | Chandramouli et al. |
| 2013/0159472 A1 | 6/2013 | Newton et al. |
| 2013/0198260 A1 | 8/2013 | Dow et al. |
| 2013/0212349 A1 | 8/2013 | Maruyama |
| 2013/0218801 A1 | 8/2013 | Rago |
| 2013/0218865 A1 | 8/2013 | Angulo et al. |
| 2013/0282417 A1 | 10/2013 | Gaedcke et al. |
| 2013/0282594 A1 | 10/2013 | Gaedcke et al. |
| 2013/0282603 A1 | 10/2013 | Gaedcke et al. |
| 2013/0282722 A1 | 10/2013 | Grenier et al. |
| 2013/0291058 A1 | 10/2013 | Wollenstein et al. |
| 2013/0298038 A1 | 11/2013 | Spivack et al. |
| 2013/0304726 A1 | 11/2013 | Sandulescu et al. |
| 2013/0304758 A1 | 11/2013 | Gruber et al. |
| 2013/0318156 A1 | 11/2013 | Friedman et al. |
| 2013/0332263 A1 | 12/2013 | Vora et al. |
| 2014/0006524 A1 | 1/2014 | Singh et al. |
| 2014/0032306 A1 | 1/2014 | Sukornyk et al. |
| 2014/0040275 A1 | 2/2014 | Dang et al. |
| 2014/0040377 A1 | 2/2014 | Friedman et al. |
| 2014/0047429 A1 | 2/2014 | Gaither et al. |
| 2014/0067520 A1 | 3/2014 | Campanile |
| 2014/0074844 A1 | 3/2014 | Subramanian et al. |
| 2014/0082072 A1 | 3/2014 | Kass et al. |
| 2014/0108675 A1 | 4/2014 | Wu |
| 2014/0164352 A1 | 6/2014 | Denninghoff |
| 2014/0173444 A1 | 6/2014 | Wu |
| 2014/0173501 A1 | 6/2014 | Wu |
| 2014/0173509 A1 | 6/2014 | Wu |
| 2014/0181087 A1 | 6/2014 | Wu |
| 2014/0181194 A1 | 6/2014 | Sullivan |
| 2014/0181728 A1 | 6/2014 | Wu |
| 2014/0184841 A1 | 7/2014 | Woo et al. |
| 2014/0200989 A1 | 7/2014 | Kassko et al. |
| 2014/0222834 A1 | 8/2014 | Parikh et al. |
| 2014/0244621 A1 | 8/2014 | Lindsay |
| 2014/0278785 A1 | 9/2014 | Gaedcke et al. |
| 2014/0280113 A1 | 9/2014 | Hohwald |
| 2014/0280398 A1 | 9/2014 | Smith et al. |
| 2014/0289034 A1 | 9/2014 | Wu |
| 2014/0298199 A1 | 10/2014 | Johnson, Jr. et al. |
| 2014/0304249 A1 | 10/2014 | Ayzenshtat et al. |
| 2014/0324902 A1 | 10/2014 | Morris et al. |
| 2014/0358911 A1 | 12/2014 | McCarthy et al. |
| 2015/0006708 A1 | 1/2015 | Banke et al. |
| 2015/0032492 A1 | 1/2015 | Ting et al. |
| 2015/0032751 A1 | 1/2015 | Ting et al. |
| 2015/0039705 A1 | 2/2015 | Kursun |
| 2015/0100537 A1 | 4/2015 | Grieves et al. |
| 2015/0112918 A1 | 4/2015 | Zheng et al. |
| 2015/0120713 A1 | 4/2015 | Kim et al. |
| 2015/0127453 A1 | 5/2015 | Tew et al. |
| 2015/0134457 A1 | 5/2015 | Cheung et al. |
| 2015/0134579 A1 | 5/2015 | Zaman et al. |
| 2015/0161211 A1 | 6/2015 | Patel et al. |
| 2015/0170294 A1 | 6/2015 | Goyal et al. |
| 2015/0193504 A1 | 7/2015 | Naidu et al. |
| 2015/0286643 A1 | 10/2015 | Kumar et al. |
| 2015/0295869 A1 | 10/2015 | Li et al. |
| 2015/0310018 A1 | 10/2015 | Fan et al. |
| 2015/0310020 A1* | 10/2015 | Brav ............... G06F 40/20 707/730 |
| 2015/0310571 A1* | 10/2015 | Brav ............... G06Q 10/00 705/311 |
| 2015/0312200 A1 | 10/2015 | Brav et al. |
| 2015/0347616 A1 | 12/2015 | Levi et al. |
| 2015/0381552 A1 | 12/2015 | Vijay et al. |
| 2016/0019628 A1 | 1/2016 | Udumudi et al. |
| 2016/0034551 A1 | 2/2016 | Huang et al. |
| 2016/0042053 A1 | 2/2016 | Webber |
| 2016/0055250 A1 | 2/2016 | Rush |
| 2016/0055541 A1* | 2/2016 | Calistri-Yeh ........ G06F 16/9535 705/14.66 |
| 2016/0057576 A1 | 2/2016 | Kessler et al. |
| 2016/0073166 A1 | 3/2016 | Hu et al. |
| 2016/0080445 A1 | 3/2016 | Kazerani et al. |
| 2016/0110688 A1 | 4/2016 | Knox et al. |
| 2016/0125157 A1 | 5/2016 | Wu |
| 2016/0132904 A1 | 5/2016 | Mondel et al. |
| 2016/0132973 A1 | 5/2016 | Wu |
| 2016/0134580 A1 | 5/2016 | Castera et al. |
| 2016/0147760 A1* | 5/2016 | N ............... G06Q 50/01 707/751 |
| 2016/0151704 A1 | 6/2016 | Wu |
| 2016/0203221 A1 | 7/2016 | Rao et al. |
| 2016/0203523 A1 | 7/2016 | Spasojevic et al. |
| 2016/0210555 A1 | 7/2016 | Murphy et al. |
| 2016/0320926 A1 | 11/2016 | Ganin et al. |
| 2016/0321261 A1 | 11/2016 | Spasojevic et al. |
| 2016/0321562 A1 | 11/2016 | Zeng |
| 2016/0321694 A1 | 11/2016 | Vorozhtsov |
| 2016/0335572 A1 | 11/2016 | Bennett et al. |
| 2016/0352667 A1 | 12/2016 | Pickett et al. |
| 2017/0154356 A1 | 6/2017 | Trevisiol et al. |
| 2017/0154366 A1 | 6/2017 | Turgeman |
| 2017/0180294 A1 | 6/2017 | Milligan et al. |
| 2017/0193546 A1* | 7/2017 | Bennett ............... G06Q 30/0201 |
| 2017/0300490 A1 | 10/2017 | Kachemir et al. |
| 2018/0053114 A1 | 2/2018 | Adjaoute |
| 2018/0091468 A1 | 3/2018 | Yong et al. |
| 2018/0144389 A1 | 5/2018 | Fredrich et al. |
| 2018/0152471 A1 | 5/2018 | Jakobsson |
| 2018/0211285 A1* | 7/2018 | Todasco ............... G06Q 30/0269 |
| 2018/0219830 A1 | 8/2018 | O'Brien et al. |
| 2018/0329565 A1 | 11/2018 | Yeung et al. |
| 2018/0367484 A1 | 12/2018 | Rodriguez et al. |
| 2019/0057204 A1 | 2/2019 | Marcovecchio et al. |
| 2019/0114356 A1 | 4/2019 | Senftleber et al. |
| 2019/0116137 A1 | 4/2019 | Senftleber et al. |
| 2019/0116148 A1 | 4/2019 | Senftleber et al. |
| 2019/0158610 A1 | 5/2019 | Holzband et al. |
| 2019/0159166 A1 | 5/2019 | Aggarwal et al. |
| 2019/0245751 A1 | 8/2019 | Wong |

(56) References Cited

U.S. PATENT DOCUMENTS

| | | |
|---|---|---|
| 2020/0120068 A1 | 4/2020 | Senftleber et al. |
| 2020/0120095 A1 | 4/2020 | Senftleber et al. |
| 2020/0120096 A1 | 4/2020 | Senftleber et al. |
| 2020/0120167 A1 | 4/2020 | Senftleber et al. |
| 2020/0287957 A1 | 9/2020 | Falcao et al. |
| 2020/0329110 A1 | 10/2020 | Holzband et al. |

FOREIGN PATENT DOCUMENTS

| | | |
|---|---|---|
| WO | 2009047674 A2 | 4/2009 |
| WO | 2013158839 A1 | 10/2013 |
| WO | 2014089460 A2 | 6/2014 |
| WO | 2014153463 A3 | 1/2015 |
| WO | 2015013436 A2 | 1/2015 |
| WO | 2019075284 A2 | 4/2019 |

OTHER PUBLICATIONS

Fiorillo, James N., Notice of Allowance and Fee(s) Due dated Nov. 14, 2019 for U.S. Appl. No. 15/821,543.

Meng, Jau Shya, Non-Final Office Action dated Jan. 3, 2020 for U.S. Appl. No. 15/877,381.

Mesa, Joel, Final Office Action dated Mar. 30, 2020 for U.S. Appl. No. 15/782,635.

Mesa, Joel, Non-Final Office Action for U.S. Appl. No. 15/782,635 dated Oct. 4, 2019.

"Craigslist Online Community." Craigslist.org. Jul. 6, 2010.

Ahmed, Saba, Final Office Action dated Jun. 29, 2016 for U.S. Appl. No. 14/098,492.

Ahmed, Saba, Non-Final Office Action mailed Nov. 19, 2015 for U.S. Patent Application No. 14/098,492.

Arentz et al., Classifying offensive sites based on image content [online], Computer Vision and Image Understanding 94, 295-310, 2004, Retrieved from the Internet:.

Bista, Sanat Kumar et al., "Using Gamification in an Online Community," CSIRO ITC Centre, Conference Paper, 2012.

Blaufeld, Justin R., Final Office Action dated Mar. 24, 2016 for U.S. Appl. No. 14/098,501.

Blaufeld, Justin R., Non-Final Office Action dated Sep. 24, 2015 for U.S. Appl. No. 14/098,501.

Bostock, Mike, Sankey Diagram, available at http://bost.ocks.org/mike/sankey, published May 21, 2012, 1 pg.

Brown Jr., Nathan H., Final Office Action dated Mar. 29, 2011 for U.S. Appl. No. 11/971,856.

Brown Jr., Nathan H., Non-Final Office Action dated Jun. 6, 2012 for U.S. Appl. No. 13/167,482.

Brown Jr., Nathan H., Non-Final Office Action dated Mar. 24, 2014 for U.S. Appl. No. 13/780,487.

Brown Jr., Nathan H., Non-Final Office Action dated Nov. 26, 2010 for U.S. Appl. No. 11/971,856.

Bui, Hanh Thi Minh, Non-Final Office Action dated Mar. 13, 2015 for U.S. Appl. No. 14/012,978.

Cannell, Larry, "Windows 7 Federated Search and SharePoint 2010" online article dated Jun. 2010 <http://blogs.gartner.com/larry-cannell/2010/09/09/windows-7-federated-search-and-sharepoint-2010/[5/13/2016 12:36:15 PM].

Chung, Mong-Shune, Non-Final Office Action dated Jan. 29, 2016 for U.S. Appl. No. 14/098,505.

Constine, Josh, "Facebook tests notification unsubscribe button for feed posts," Aug. 9, 2010. http://www.adweek.com/socialtime/unsubscribe-button-posts/244868.

Dwyer, Cameron, "Five out-of-the-box ways to get Email into SharePoint" Jan. 2012, <https://camerondwyer.wordpress.com/2012/09/04/five-out-of-the-box-ways-to-get-email-into-sharepoint/[5/13/2016 10:48:43 AM].

Emojipedia, (https://web.archive.org/web/20150915110235/https://emojipedia.org/fisted-hand-sign/), Date: Sep. 15, 2015; (https://web.archive.org/web/20150823012626/https://emojipedia.org/clapping-hands-sign/), Date: Aug. 23, 2015; (https://web.archive.org/web/20150829090848/https://emojipedia.org/smiling-face-with-sunglasses/), Date: Aug. 29, 2015.

Falcao et al., U.S. Appl. No. 15/877,379, filed Jan. 22, 2018 and entitled, "Temporal Optimization of Data Operations Using Distributed Search and Server Management.".

Falcao et al., U.S. Appl. No. 15/877,381, filed Jan. 22, 2018 and entitled, "Temporal Optimization of Data Operations Using Distributed Search and Server Management."

Filipczyk, Marcin R., Final Office Action dated Oct. 5, 2015 for U.S. Appl. No. 13/950,268.

Filipczyk, Marcin R., Non-Final Office Action dated Mar. 10, 2016 for U.S. Appl. No. 13/950,268.

Filipczyk, Marcin R., Non-Final Office action dated May 22, 2015 for U.S. Appl. No. 13/950,268.

Friedman et al., U.S. Appl. No. 61/650,849, filed May 23, 2012 and entitled, "Dynamic Information Streams in a Social Network Platform."

Frunzi, Victoria E., Non-Final Office Action dated Oct. 16, 2018 for U.S. Appl. No. 15/018,787.

Gaedckle et al., U.S. Appl. No. 61/636,132, filed Apr. 20, 2012 and entitled, "System and Method for Providing a Social Customer Care System."

Georgandellis, Andrew C., Final Office Action dated Mar. 30, 2016 for U.S. Appl. No. 13/900,878.

Georgandellis, Andrew C., Final Office Action dated Oct. 26, 2017 for U.S. Appl. No. 13/900,878.

Georgandellis, Andrew C., Final Office Action dated Sep. 21, 2016 for U.S. Appl. No. 14/035,166.

Georgandellis, Andrew C., Non-Final Office Action dated Jan. 26, 2017 for U.S. Appl. No. 13/900,878.

Georgandellis, Andrew C., Non-Final Office Action dated Jul. 11, 2016 for U.S. Appl. No. 14/035,166.

Georgandellis, Andrew C., Non-Final Office Action dated May 23, 2017 for U.S. Appl. No. 14/035,166.

Georgandellis, Andrew C., Non-Final Office Action dated Nov. 3, 2015 for U.S. Appl. No. 13/900,878.

Giphy, (https://web.archive.org/web/20140813065113/http://giphy.com/search/happy), Date: Aug. 13, 2014; https://web.archive.org/web20141231135329/https://giphy.com/upload, Date: Dec. 31, 2014; https://web.archive.org/web/20150919214012/http://giphy.com/create/upload, Date: Sep. 19, 2015.

Goldberg, Ivan R., Final Office Action dated Jan. 12, 2015 for U.S. Appl. No. 13/835,502.

Goldberg, Ivan R., Final Office Action dated Jan. 13, 2015 for U.S. Appl. No. 13/835,250.

Goldberg, Ivan R., Final Office Action dated Jan. 15, 2015 for U.S. Appl. No. 13/865,429.

Goldberg, Ivan R., Non-Final Office Action dated Apr. 13, 2016 for U.S. Appl. No. 13/865,429.

Goldberg, Ivan R., Non-Final Office Action dated Jun. 18, 2014 for U.S. Appl. No. 13/835,250.

Goldberg, Ivan R., Non-Final Office Action dated Jun. 18, 2014 for U.S. Appl. No. 13/835,502.

Goldberg, Ivan R., Non-Final Office Action dated Jun. 20, 2014 for U.S. Appl. No. 13/865,411.

Goldberg, Ivan R., Non-Final Office Action dated Jun. 23, 2014 for U.S. Appl. No. 13/865,429.

Hashemi, Mazdak, "The Infrastructure Behind Twitter: Scale", Jan. 19, 2017, Twitter, Inc. Blog Post, https://blog.twitter.com/engineering/en_us/topics/infrastructure/2017/the-infrastructure-behind-twitter-scale.html.

Hatcher, Deirdre D., Non-Final Office Action dated Jan. 14, 2016 for U.S. Appl. No. 13/950,258.

Lithium Website, http://www.lithium.com, Dec. 11, 2010, retrieved from Internet Archive, pp. 1-9.

M2 PressWire, "Alterian: Social media monitoring and analytics comes of age with Alterian's acquisition of market leader Techrigy," Jul. 15, 2009, Anonymous, Norman Media Ltd, London.

Mosley, Kyle T., Non-Final Office Action dated Dec. 28, 2017 for U.S. Appl. No. 14/852,965.

Mosley, Kyle T., Non-Final Office Action dated Oct. 4, 2017 for U.S. Appl. No. 14/627,151.

(56) References Cited

OTHER PUBLICATIONS

Netzloff, Eric R., Non-Final Office Action dated Nov. 25, 2014 for U.S. Appl. No. 13/848,706.
Netzloff, Eric R., Non-Final Office Action dated Nov. 6, 2018 for U.S. Appl. No. 14/824,021.
Ofori-Awuah, Maame, Non-Final Office Action dated Apr. 5, 2019 for U.S. Appl. No. 14/929,209.
Oh, Eung Gie, Written Opinion of the International Searching Authority and International Search Report dated Nov. 18, 2014 for International Patent Application No. PCT/US2014/031345.
Olshannikov, Alex, Final Office Action dated Apr. 15, 2016 for U.S. Appl. No. 14/098,480.
Olshannikov, Alex, Final Office Action dated Feb. 17, 2016 for U.S. Appl. No. 14/098,509.
Olshannikov, Alex, Non-Final Office Action dated Nov. 5, 2015 for U.S. Appl. No. 14/098,480.
Olshannikov, Alex, Non-Final Office Action dated Oct. 22, 2015 for U.S. Appl. No. 14/098,509.
Raju, "5 Ways to Tweet More Than 140 Characters," Dec. 28, 2008, Technically Personal, http://www.techpp.com/2008/12/28/5-ways-to-tweet-more-than-140-characters/, retrieved from Internet Archive version from Mar. 3, 2011.
Rao et al., U.S. Appl. No. 62/049,642, filed Sep. 12, 2014 and entitled, "System and Apparatus for an Application Agnostic User Search Engine."
Rashid, Ishrat, Non-Final Office Action dated Jun. 11, 2019 for U.S. Appl. No. 15/782,653.
Senftleber et al., International (PCT) Patent Application No. PCT/US2018/055545, filed Oct. 12, 2018 and entitled, "Predicting Performance of Content and Electronic Messages Among a System of Networked Computing Devices."
Senftleber et al., U.S. Appl. No. 15/782,635, filed Oct. 12, 2017 and entitled, "Computerized Tools to Enhance Speed and Propagation of Content in Electronic Messages Among a System of Networked Computing Devices."
Senftleber et al., U.S. Appl. No. 15/782,642, filed Oct. 12, 2017 and entitled, "Predicting Performance of Content and Electronic Messages Among a System of Networked Computing Devices."
Senftleber et al., U.S. Appl. No. 15/782,653, filed Oct. 12, 2017 and entitled, "Optimizing Effectiveness of Content in Electronic Messages Among a System of Networked Computing Device."
Senftleber et al., U.S. Appl. No. 16/158,167, filed Oct. 11, 2018 and entitled, "Credential and Authentication Management in Scalable Data Networks."
Senftleber et al., U.S. Appl. No. 16/158,169, filed Oct. 11, 2018 and entitled, "Native Activity Tracking Using Credential and Authentication Management in Scalable Data Networks."
Senftleber et al., U.S. Appl. No. 16/158,172, filed Oct. 11, 2018 and entitled, "Proxied Multi-Factor Authentication Using Credential and Authentication Management in Scalable Data Networks."
Senftleber et al., U.S. Appl. No. 16/194,126, filed Nov. 16, 2018 and entitled, "Multiplexed Data Exchange Portal Interface in Scalable Data Networks."
Spasojevic et al., U.S. Appl. No. 61/943,047, filed Feb. 21, 2014 and entitled, "Domain Generic Large Scale Topic Expertise & Interest Mining Across Multiple Online Social Networks."
Tabor, Amare F., Final Office Action dated Apr. 8, 2015 for U.S. Appl. No. 13/871,076.
Tabor, Amare F., Non-Final Office Action dated Aug. 15, 2014 for U.S. Appl. No. 13/871,076.
Thomas, Shane, Written Opinion of the International Searching Authority and International Search Report dated Aug. 16, 2013 for International Patent Application No. PCT/US2013/037107.
Vo, Huyen X., Non-Final Office Action dated Mar. 15, 2019 for U.S. Appl. No. 15/782,642.
Walsh, John B., Non-Final Office Action dated Mar. 24, 2017 for U.S. Appl. No. 14/702,696.
Wollenstein et al., U.S. Appl. No. 61/639,509, filed Apr. 27, 2012 and entitled, "Systems and Methods for Implementing Custom Privacy Settings."
Wu, Michael, U.S. Appl. No. 61/734,927, filed Dec. 7, 2012 and entitled, "Systems Methods for Presenting Analytic Data."
Wu, Michael, U.S. Appl. No. 62/072,929, filed Oct. 30, 2014 and entitled, "Systems Methods to Monitor Health of Online Social Communities."
Young, Lee W., Notification of Transmittal of the International Search Report and the Written Opinion of the International Searching Authority, or the Declaration, dated Apr. 1, 2019 for International Application No. PCT/US2018/05545.
Young, Lee W., Written Opinion of the International Searching Authority and International Search Report dated May 28, 2014 for International Patent Application No. PCT/US2013/073625.
Young, Lee W.; Notification of Transmittal of the International Search Report and the Written Opinion of the International Searching Authority, or the Declaration dated Jun. 24, 2019 for International Application No. PCT/US2019/014637.
Holzband et al., U.S. Appl. No. 15/821,543, filed Nov. 22, 2017 and entitled, "Responsive Action Prediction Based on Electronic Messages Among a System of Networked Computing Devices."
Jang, Gijeong, Written Opinion of the International Searching Authority and International Search Report dated Jul. 28, 2015 for International Patent Application No. PCT/US2014/047866.
Jou et al., "Predicting Viewer Perceived Emotions in Animated GIFs", Nov. 3-7, 2014 (4 pages).
Kolosowski-Gager, Katherine, Final Office Action dated Feb. 11, 2019 for U.S. Appl. No. 14/627,151.
Kolosowski-Gager, Katherine, Non-Final Office Action dated Jun. 29, 2018 for U.S. Appl. No. 14/627,151.
Lithium Technologies. "Community Health Index for Online Communities." 2009, https://www.lithium.com/pdfs/whitepapers/Lithium-Community-Health-Index_v1AY2ULb.pdf. Retrieved from the Internet Wayback Machine, dated Feb. 19, 2011.
Fiorillo, James N., Non-Final Office Action for U.S. Appl. No. 15/821,543 dated Aug. 16, 2019.
Matthews, Tara, et al. "Community Insights: Helping Community Leaders Enhance the Value of Enterprise Online Communities." Proceedings of the SIGCHI Conference on Human Factors in Computing Systems, Apr. 27-May 2, 2013, Paris, France. ACM (2013). pp. 513-522.
Ofori-Awuah, Maame, Final Office Action dated Sep. 6, 2019 for U.S. Appl. No. 14/929,209.
Rashid, Ishrat, Final Office Action for U.S. Appl. No. 15/782,653 dated Sep. 19, 2019.
Wang, Xiaoqing, and Shannon Lantzy. "A Systematic Examination of Member Turnover and Online Community Health." Thirty Second International Conference on Information Systems, Shanghai (2011), pp. 1-11.
Dagnew, Saba, Final Office Action dated Feb. 12, 2020 for U.S. Appl. No. 15/581,795.
Dagnew, Saba, Non-Final Office Action for U.S. Appl. No. 15/581,795 dated Sep. 16, 2019.
Kim, Harry C., Notification of Transmittal of the International Search Report and the Written Opinion of the International Searching Authority, or the Declaration dated Sep. 16, 2020 for International Patent Application No. PCT/US2020/032999.
Meng, Jau Shya, Non-Final Office Action dated Jun. 16, 2020 for U.S. Appl. No. 15/877,381.
Mesa, Joel, Non-Final Office Action dated Oct. 6, 2020 for U.S. Appl. No. 15/782,635.
Ofori-Awuah, Maame, Final Office Action dated Oct. 2, 2020 for U.S. Appl. No. 14/929,209.
Perungavoor, Venkatanaray, Notice of Allowance and Fee(s) Due for U.S. Appl. No. 16/158,167, dated May 15, 2020.
Rashid, Ishrat, Non-Final Office Action dated Jun. 12, 2020 for U.S. Appl. No. 15/782,653.
Spasojevic, Nemanja et al., "When-To-Post on Social Networks", International Conference on Knowledge Discovery and Data Mining (KDD), Aug. 10-13, 2015, pp. 2127-2136, Retrieved Online: http://dl.acm.org/citation.cfm? d=2788584.
Suh, Andrew, Non-Final Office Action dated Jul. 8, 2020 for U.S. Appl. No. 16/158,172.

(56) References Cited

OTHER PUBLICATIONS

Takesue, Masaru, An HTTP Extension for Secure Transfer of Confidential Data, 2009 IEEE International Conference on Networking, Architecture, and Storage, Hunan, 2009, pp. 101-108, doi: 10.1109/NAS.2009.21.
Trapanese, William C., Non-Final Office Action dated May 27, 2020 for U.S. Appl. No. 16/413,577.

* cited by examiner

PREDICTING PERFORMANCE OF CONTENT AND ELECTRONIC MESSAGES AMONG A SYSTEM OF NETWORKED COMPUTING DEVICES

CROSS-REFERENCE TO APPLICATIONS

This application is a continuation application of copending U.S. Nonprovisional patent application Ser. No. 15/782,642, filed Oct. 12, 2017 and entitled, "PREDICTING PERFORMANCE OF CONTENT AND ELECTRONIC MESSAGES AMONG A SYSTEM OF NETWORKED COMPUTING DEVICES;" This application is related to U.S. patent application Ser. No. 15/782,635, filed on Oct. 12, 2017 and entitled, "COMPUTERIZED TOOLS TO ENHANCE SPEED AND PROPAGATION OF CONTENT IN ELECTRONIC MESSAGES AMONG A SYSTEM OF NETWORKED COMPUTING DEVICES;" This application is also related to U.S. patent application Ser. No. 15/782,653, filed on Oct. 12, 2017 and entitled, "OPTIMIZING EFFECTIVENESS OF CONTENT IN ELECTRONIC MESSAGES AMONG A SYSTEM OF NETWORKED COMPUTING DEVICES;" all of which are herein incorporated by reference in their entirety for all purposes.

FIELD

Various embodiments relate generally to data science and data analysis, computer software and systems, and control systems to provide a platform to facilitate implementation of an interface, and, more specifically, to a computing and data storage platform that implements specialized logic to predict effectiveness of content in electronic messages as a function, for example, modifiable portions of the content.

BACKGROUND

Advances in computing hardware and software have fueled exponential growth in delivery of vast amounts of information due to increased improvements in computational and networking technologies and infrastructure. Also, advances in conventional data storage technologies provide an ability to store increasing amounts of generated data. Thus, improvements, in computing hardware, software, network services, and storage have bolstered growth of Internet-based messaging applications, especially in an area of generating and sending information regarding availability of products and services. Unfortunately, such technological improvements have contributed to a deluge of information that is so voluminous that any particular message may be drowned out in the sea of information. Consequently, a number of conventional techniques have been employed to target certain recipients of the information so as to hopefully increase interest and readership of such information.

In accordance with some conventional techniques, creators of content and information, such as merchants and sellers of products or services, have employed various known techniques to target specific groups of people that may be likely to respond or consume a particular set of information. These known techniques, while functional, suffer a number of other drawbacks.

The above-described advancements in computing hardware and software have given rise to a myriad of communication channels through which information may be transmitted to the masses. For example, information may be transmitted via messages through email, text messages, website posts, social networking, and the like. As such, traditional approaches to communicate information have been generally focused on transmitting information coarsely, with attempts to focus transmission of information to a certain number of possible consumers of interest. However, conventional approaches to leverage social media to reach particular audiences (e.g., microsegments) have been suboptimal in securing participation in consuming information that, for example, will likely lead to a conversion (e.g., a product purchase). While functional, such approaches suffer a number of other drawbacks.

For example, various conventional approaches by which to identify a particular recipient of information are generally vulnerable to less precise identification of, for example, a particular recipient's engagement with such information. Consequently, traditional electronic message propagation techniques are typically less effective in communicating to a broadest group of potentially interested consumers of such information.

Thus, what is needed is a solution for facilitating techniques to enhance speed and distribution of content in electronic messages, without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents thereof. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1:
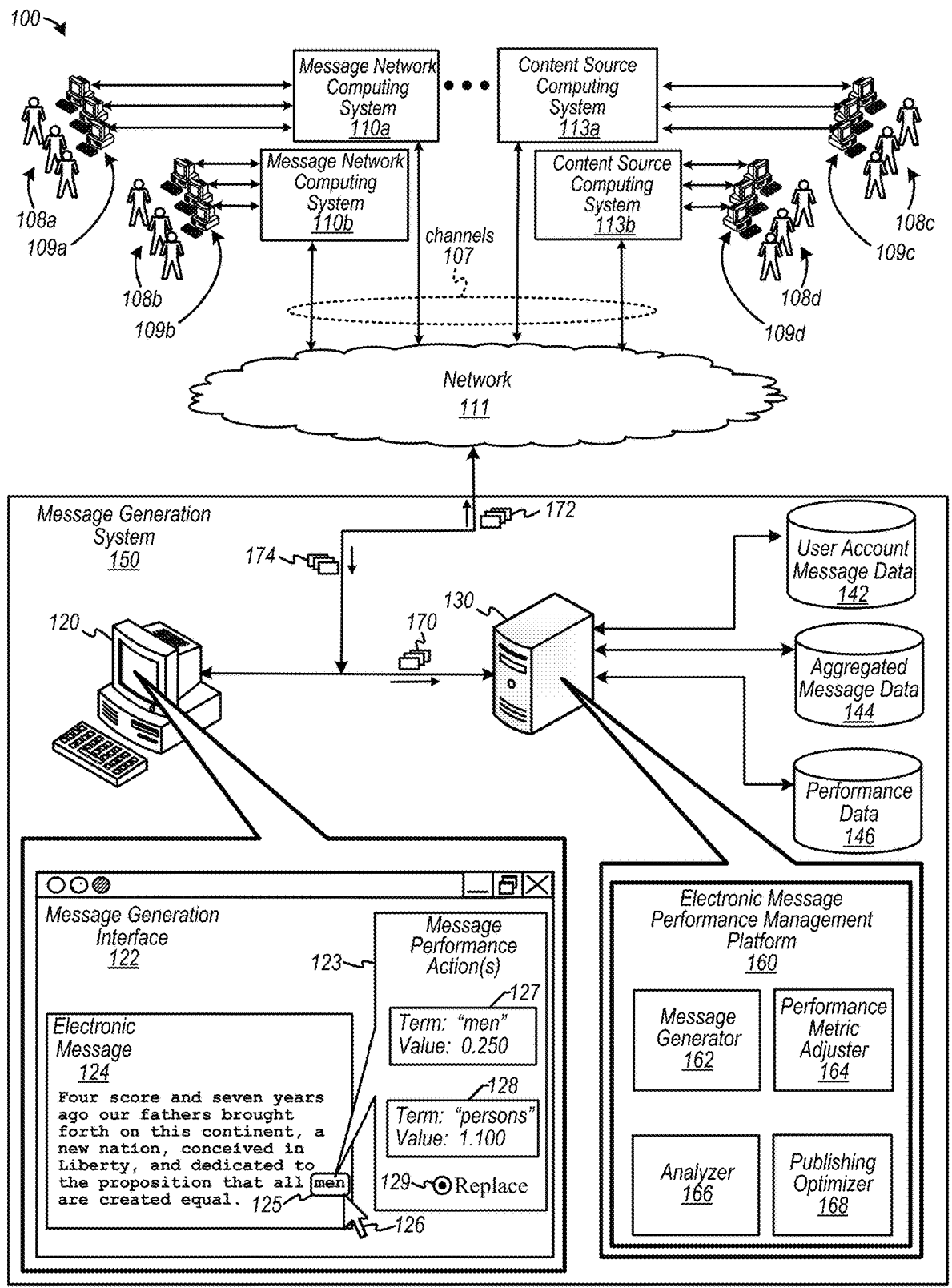
FIG. 1 is a diagram depicting computerized tools to generate an electronic message targeted to a subset of recipients, according to some embodiments.

FIG. 1 is a diagram depicting computerized tools to generate an electronic message targeted to a subset of recipients, according to some embodiments. Diagram 100 depicts an example of a message generation system 150 configured to enhance speed and distribution of content in electronic messages 172 as a function of, for example, a portion of the content, according to some embodiments. A portion of content in an electronic message may include a symbol (e.g., a letter or number), a word, a group of words, such as a phrase, a message topic, or any other characteristic of the electronic message associated with, or descriptive of, the message, according to various examples. In one example, electronic message performance management platform 160 may be configured to analyze an electronic message being generated, and proffer recommended actions to enhance the speed and/or distribution of electronic messages 172 to users 108a, 108b, 108c, and 108d.

Diagram 100 depicts a message generation system 150 including a user interface 120 and a computing device 130 (e.g., one or more servers, including one or more processors and/or memory devices), both of which may be configured to generate messages that may be configured for users 108a, 108b, 108c, and 108d. Users 108a and 108b may interact via computing devices 109a and 109b with message network computing systems 110a and 110b, respectively, whereas users 108c and 108d may interact via computing devices 109c and 109d with content source computing systems 113a and 113b, respectively. Any one or more of message network computing systems 110a and 110b may be configured to receive electronic messages, regardless of the context, for propagating (e.g., sharing), commenting, and consumption by any number of users for any reason, according to some examples. One or more of message network computing systems 110a and 110b may be configured to distribute electronic message content in any form in any digital media or channel. In various examples, message network computing systems 110a and 110b may include any number of computing systems configured to propagate electronic messaging, including, but not limited to, computing systems including third party servers, such as third parties like Facebook™, Twitter™, LinkedIn™, Instagram™, Snapchat™, as well as other private or public social networks to provide social-media related informational data exchange services. In some examples, message generation system 150 configured to enhance speed and distribution of content from any source of digital content. As such, users 108a and 108b may interact via computing devices 109a and 109b with message network computing systems 110a and 110b, respectively, whereas users 108c and 108d may interact via computing devices 109c and 109d with content source computing systems 113a and 113b, respectively. Computing systems 113a and 113b may be configured to provide any type of digital content, such as email, text messaging (e.g., via SMS messages), web pages, audio, video (e.g., YouTube™), etc.

According to some examples, message network computing systems 110a and 110b may include applications or executable instructions configured to principally facilitate interactions (e.g., social interactions) amongst one or more persons, one or more subpopulations (e.g., private groups or public groups), or the public at-large. Examples of message network computing systems 110a and 110b include the above-mentioned Facebook™, Twitter™, LinkedIn™, Instagram™, and Snapchat™, as well as YouTube™, Pinterest™, Tumblr™, WhatsApp™ messaging, or any other platform configured to promote sharing of content, such as videos, audio, or images, as well as sharing ideas, thoughts, etc. in a socially-based environment. According to some examples, content source computing systems 113a and 113b may include applications or executable instructions configured to principally promote an activity, such as a sports television network, a profession sports team (e.g., a National Basketball Association, or NBA®, team), a news or media organization, a product producing or selling organization, and the like. Content source computing systems 113a and 113b may implement websites, email, chatbots, or any other digital communication channels, and may further implement electronic accounts to convey information via message network computing systems 110a and 110b.

In view of the structures and/or functionalities of message network computing systems 110a and 110b and content source computing systems 113a and 113b, an electronic message may include a "tweet" (e.g., a message via a Twitter™ computing system), a "post" (e.g., a message via a Facebook™ computing system), or any other type of social network-based messages, along with any related functionalities, such as forwarding a message (e.g., "retweeting" via Twitter™), sharing a message, associating an endorsement of another message (e.g., "liking" a message, such as a Tweet™, or sharing a Facebook™ post, etc.), and any other interaction that may cause increased rates of transmissions, or may cause increased multiplicity of initiating parallel transmissions (e.g., via a "retweet" of a user having a relatively large number of followers). According to various examples, an electronic message can include any type of digital messaging that can be transmitted over any digital networks.

According to some embodiments, message generation system 150 may be configured to facilitate modification of an electronic message (e.g., its contents) to enhance a speed and/or a rate of propagation at which the message may be conveyed in accordance with, for example, a value of a performance metric. According to various examples, a value of a performance metric may include data representing a value of an engagement metric, an impression metric, a link activation metric (e.g., "a click-through"), a shared message indication metric, a follower account indication metric, etc., or any other like metric or performance attribute that may be monitored and adjusted (e.g., indirectly by modifying content) to conform transmission of an electronic message to one or more performance criteria.

Message generation system 150 is shown to include a computing device 120 and display configured to generate a user interface, such as a message generation interface 122. Message generation system 150 also includes a server computing device 130, which may include hardware and software, or a combination thereof, configured to implement an electronic message performance management platform 160 (or "performance management platform 160"), according to various examples. Performance management platform 160 may include a message generator 162 configured to generate electronic messages configured to urge or cause a targeted rate of transmission and/or multiplicity of propagation (e.g. a rate of parallel transmissions) for an electronic message responsive, for example, to interactions with the message by recipient computing devices 109a, 109b, 109c, and 109d (e.g., by recipient users 108a, 108b, 108c, and 108d). Performance management platform 160 may also include a performance metric adjuster 164 configured to adjust one or more portions or components of an electronic message being generated at message generator 162 so that the generated electronic message may achieve (or attempt to achieve) certain levels of performance as defined, for example, by one or more performance metric criteria.

To illustrate a functionality of performance management platform 160, consider an example in which a user generates an electronic message 124 via message generation interface 122 for transmission to one or more similar or different computing systems 110a, 110b, 113a, and 113b. As shown, a user may interact with computing device 120 to generate an electronic message 124. Prior to transmission, performance management platform 160 includes logic configure to analyze and evaluate electronic message 124 to adjust one or more portions, such as portion 125, to enhance the rate of transmission, propagation, or any other performance metric. In this example, the term "men" in an electronic message 124 is identified by performance management platform 160 as having a performance metric value of "0.250," as shown in graphical representation 127. Optionally, a user may cause a selection device 126 to hover over or select a graphical representation of portion 125. In response, one or more message performance actions 123 may be presented to the user. Here, at least one message performance action 123 includes a recommendation to replace the term "men," having a performance metric value of "0.250," with another term "persons" having a performance metric value of "1.100" as shown in graphical representation 127. Note that the magnitude of the performance metric value of "persons" is greater than that for the term "men." Thus, an electronic message implement the term "persons" may be predicted to perform better than if the term "men" was included.

In at least one example, the performance metric values of 0.250 and 1.100 may represent a degree or amount of "engagement." "Engagement" may be described, at least in some non-limiting examples, as an amount of interaction with an electronic message. Data representing an engagement metric may specify an amount of interaction with an electronic message. A value of an engagement metric value may be indicative of whether an electronic message is accessed (e.g., opened or viewed), and whether any one or more interactions with the electronic message are identified (e.g., generation of another electronic message responsive to an initial message). Hence, a user may desire to increase engagement by selecting to replace via user input 129 the term "men" with the term "persons." With increased values of an engagement metric, the electronic message may be predicted to have greater amounts of interaction than otherwise might be the case.

Other performance metrics and associated values may also be implemented to gauge whether electronic message 124 may achieve a user's objectives (e.g., a marketer or any other function), and to modify or adjust electronic message 124 to meet a subset of performance criteria (e.g., to meet an engagement of value "E" for a period of time "T"). For example, electronic message 124, as well as one or more components thereof, may be generated in accordance with another performance metric, such as an impression metric. An "impression" may be described, at least in some non-limiting examples, as an instance in which an electronic message is presented to a recipient (e.g., regardless whether the recipient interacts with the message). A performance metric may include a "link activation," which may be described, at least in some non-limiting examples, as an instance in which a link (e.g., a hypertext link) in an electronic message is activated. An example of a link activation is a "click-through," among other message-related metrics or parameters with which to measure one or more levels of performance of an electronic message, such as a Twitter post relating to a product promotion and campaign. A performance metric may include a "shared" message, which may be described, at least in some non-limiting examples, as an instance in which a recipient 108a, 108b, 108c, or 108d re-transmits (e.g., "retweets") an electronic message to one or more other users, thereby propagating the message with multiplicity. A performance metric may include a "followed message" status, which may be described as an instance in which recipients 108a, 108b, 108c, or 108d may receive the electronic message based on a "following" relationship to the original recipient. According to various embodiments, other performance metrics may be implemented in message generation system 150.

Diagram 100 further depicts performance management platform 160 being coupled to memory or any type of data storage, such as data repositories 142, 144, and 146, among others. User account message data 142 may be configured to store any number of electronic messages 124 generated or transmitted by performance management platform 160. For example, performance management platform 160 may be configured to store electronic message 124 (e.g., as historic archival data). Also, performance management platform 160 may be configured to determine characteristics or attributes of one or more components of an electronic message (e.g., as a published messages). According to some examples, a component of an electronic message may include a word, a phrase, a topic, or any message attribute, which can describe the component. For example, a message attribute may include metadata that describes, for example, a language associated with the word, or any other descriptor, such as a synonym, a language, a reading level, a geographic location, and the like. Message attributes may also include values of one or more performance metrics (e.g., one or more values of engagement, impressions, etc.), whereby, at least in some cases, a value of a performance metric may be a function of context during which an electronic message is published (e.g., time of day, day of week, types of events occurring locally, nationally, or internationally, the demographics of recipients 108a, 108b, 108c, and 108d, etc.). Components of messages may be tagged or otherwise associated with any of the above-described metadata.

Further, performance management platform 160 may be configured to analyze a subset of electronic message (e.g., including a quantity of 50 or more messages) that may include or otherwise be associated with a component, such as the word "men," which is depicted in the example of diagram 100. Performance management platform 160 may include logic to analyze various levels of performance based on the usage of the term "men" in previous posts. Likewise, performance management platform 160 may determine a level of performance for the usage of the term "persons" in past posts or electronic messages. In this example, performance management platform 160 may determine that inclusion of the term "persons" may provide an engagement value of +1.100, whereas the term "men" may provide an engagement value of +0.250. As "persons" may be viewed as a synonym (or as a suitable substitute) for "men," message generator 162 may (e.g., automatically, in some cases) replace the term "men" with the term "persons" so as to increase a level of engagement by a predicted amount (e.g., the difference between +1.100 and +0.250).

Similarly, performance management platform 160 may be configured to receive data 174 (e.g., electronic messages, posts, webpages, emails, etc.) from any number of platforms 110a, 110b, 113a, and 113b to determine components and corresponding characteristics or attributes that may be used by entities external to message generation system 150. Performance management platform 160 also may be configured to analyze and characterize one or more levels of performance for message components in data 174 (e.g., electronic messages generated by platforms 110a, 110b, 113a, and 113b). Thus, components derived from data 174 may be characterized with respect to a performance metric (e.g., a value of engagement), and may be stored in aggregated message data repository 144. Continuing with the example of diagram 100, engagement values of +1.100 and +0.250 (or portions thereof) may be derived based on either user account message data in repository 142 or aggregate message data in repository 144, or a combination thereof. According to some examples, performance metric criteria and any other data may be stored in performance data repository 146, including data representing one or more performance curves. A performance curve, at least in some non-limiting examples, may include data representing a performance metric (e.g., a number of impressions) as a function of time, or any other performance metric or contextual parameter.

To illustrate operation of performance management platform 160, consider that performance management platform 160 may receive data signals 170 (e.g., from a user interface associated with computing device 120) to cause formation of an electronic message 124. Message generator 162 may be configured to identify one or more performance metric values, such as one or more engagement values, assigned to one or more portions (or components, such as the word "men") of electronic message 124. Further, performance metric adjuster 164 may be configured to determine an equivalent to a portion of electronic message 124 to enhance a performance metric value. Here, performance metric adjuster 164 may be configured to determine a word or term "persons" is equivalent (e.g., as a synonym) to "men," and may be further configured to substitute the equivalent (e.g., equivalent word) in place of a message portion to form an adapted electronic message 172. Thereafter, adapted electronic message 172 may be published (e.g., transmitted) in accordance with, for example, a scheduled point in time. According to various examples, message generator 162 is configured to generate various formatted versions of adapted electronic message 172, whereby each formatted version may be compatible with a particular platform (e.g., social networking platform). Thus, adaptive electronic message 172 can be transmitted via a network 111 for presentation on user interfaces on a plurality of computing devices 109a, 109b, 109c, and 109d. Also, message generator 162 may be configured to format various data for graphically presenting information and content of electronic message 124 on a user interface of computing device 120.

According to some examples, performance management platform 160 may be further configured to implement a performance analyzer 166 and a publishing optimizer 164. Performance analyzer 166 may be configured to perform an analysis on one or more components of a message prior to publishing so as to determine whether one or more components of the message comply with one or more performance metric criteria. Further, performance analyzer 166 may be configured to identify one or more component characteristics or attributes that may be modified so as to allow an electronic message to comply one or more performance criteria. According to some examples, performance analyzer 166 may be configured to analyze various amounts of message data from various data sources to identify patterns (e.g., of microsegments) of message recipients at granular levels so as to identify individual users or a subpopulation of users.

Publishing optimizer 168 may be configured to determine an effectiveness of an electronic message relative to one or more performance metrics and time. In some examples, publishing optimizer 168 may monitor values of a performance metric against a performance criterion to determine when an effectiveness of an electronic message is decreasing or has reached a particular value. Responsive to determining reduced effectiveness, publishing optimizer 168 may be configured to implement another electronic message.

Figure 2:
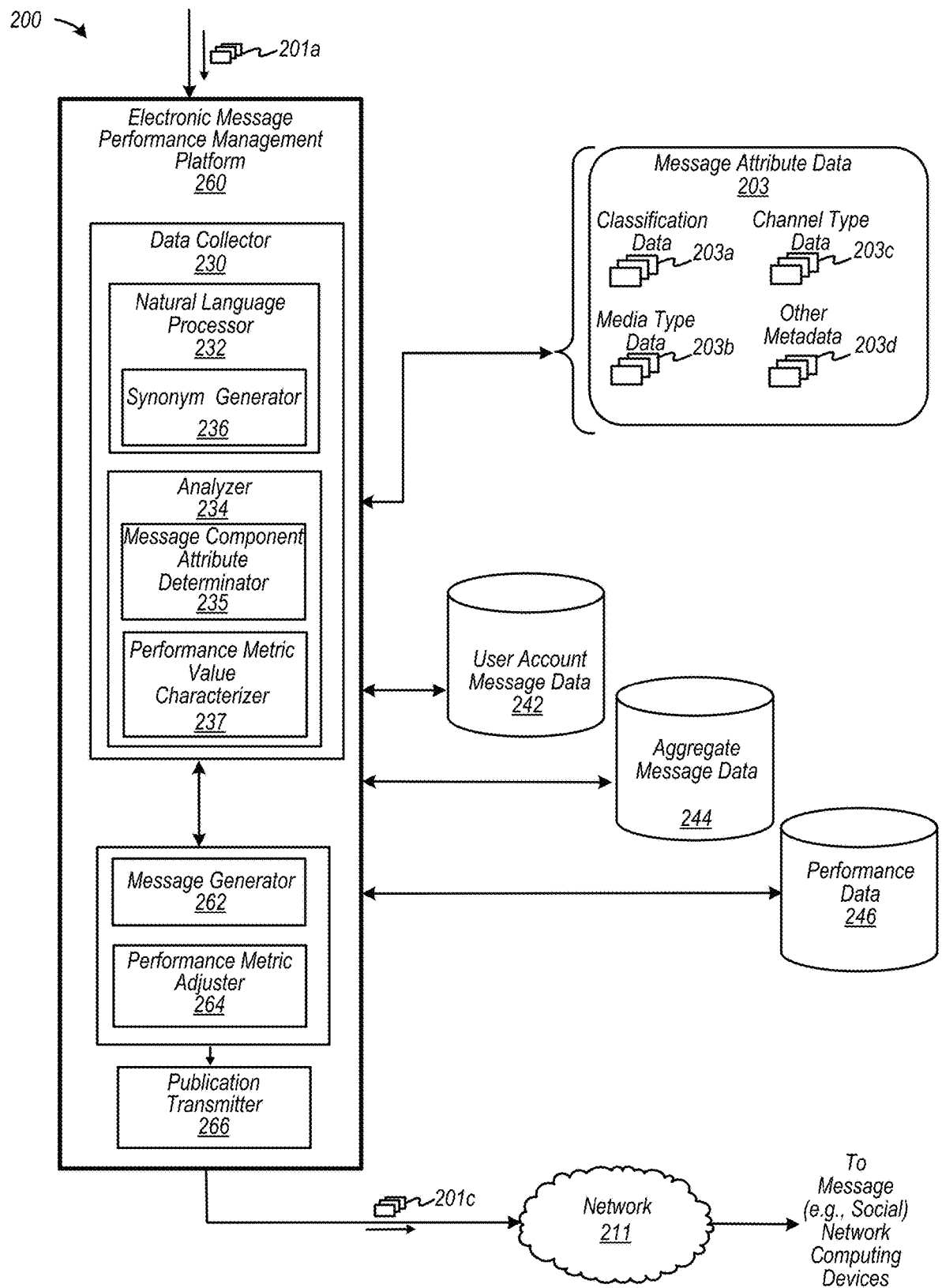
FIG. 2 depicts another example of an electronic message performance management platform, according to various examples.

FIG. 2 depicts another example of an electronic message performance management platform, according to various examples. Diagram 200 depicts a performance management platform 260 including a data collector 230, which, in turn, includes a natural language processor 232 and an analyzer 234, a message generator 262, a performance metric adjuster 264, and a publication transmitter 266. Performance management platform 260 may be configured to receive data 201a, which may include electronic message data from a particular user account or from any number of other electronic accounts (e.g., social media accounts, email accounts, etc.). Further, performance management platform 260 may be configured to publish an electronic message 201c via network 211 to any number of message networked computing devices (not shown). In one or more implementations, elements depicted in diagram 200 of FIG. 2 may include structures and/or functions as similarly-named or similarly-numbered elements depicted in other drawings.

Data collector 230 is configured to detect and parse the various components of an electronic message, and further is configured to analyze the characteristics or attributes of each component, as well as to characterize a performance metric of a component (e.g., an amount of engagement for a component). Natural language processor 232 may be configured to parse (e.g., using word stemming, etc.) portions of an electronic message to identify components, such as a word or a phrase. Also, natural language processor 232 may be configured to derive or characterize a message as being directed to a particular topic based on, for example, known sentiment analysis techniques, known content-based classification techniques, and the like. In some examples, natural language processor 232 may be configured to apply word embedding techniques in which components of an electronic message may be represented as a vector of numbers. As shown, natural language processor 232 includes a synonym generator 236 configured to identify synonyms or any other suitably compatible terms for one or more words in an electronic message being generated (e.g., prior to publication). For example, synonym generator 236 may be configured to identify the term "U.S.A." as a synonym, or suitable substitution, for the term "America." In at least one example, synonym generator 236 may be configured to compare two or more components (e.g., two or more words and corresponding vectors) to determine a degree to which at least two components may be similar, and, thus may be used as synonyms. A degree of similarity between two words may be derived by determining, for example, a cosine similarity between respective vectors of the words. Note that synonym generator 236 may determine substitutable words based on hierarchical relationships (e.g., substituting the word "China" for the word "Beijing"), genus-species relationships, or any other relationships among similar or compatible words or components.

Analyzer 234 may be configured to characterize various components to identify characteristics or attributes related to a component, and may further be configured to characterize a level of performance for one or more performance metrics. Analyzer 234 includes a message component attribute determinator 235 and a performance metric value characterizer 237, according to the example shown. Message component attribute determinator 235 may be configured to identify characteristics or attributes, such as message attribute data 203, for a word, phrase, topic, etc. In various examples, message attribute data 203 may be appended, linked, tagged, or otherwise associated with a component to enrich data in, for example, user account message data repository 242 and aggregate message data repository 244. A synonym may be a characteristic or an attribute of a message component. Examples of message attribute data 203 are depicted as classification data 203a (e.g., an attribute specifying whether a component may be classified as one or more of a word, phrase, or topic), media type data 203b (e.g., an attribute specifying whether a component may be classified as being associated with an email, a post, a webpage, a text message, etc.), channel type data 203c (e.g., an attribute specifying whether a component may be associated with a type of social networking system, such as Twitter). Other metadata 203d may be associated with, or tagged to, a word or other message component. As such, other metadata 203d may include a tag representing a language in which the word is used (e.g., a tag indicating English, German, Mandarin, etc.). Other metadata 203d may include a tag representing a context in which a word is used in one or more electronic messages, such as in the context of message purpose (e.g., a tag indicating a marketing campaign, or the like), an industry or activity (e.g., a tag indicating an electronic message component relating to autonomous vehicle technology, or basketball), etc. In some cases, other metadata 203d may include data representing computed values of one or more performance metrics (e.g., a tag indicating values of an amount of engagement, etc.) as characterized by performance metric value characterizer 237.

Performance metric value characterizer 237 may be configured to evaluate a components and corresponding characteristics or attributes to characterize a value associated with the performance metric. For example, a value of engagement as a performance metric may be computed as a number of interactions, including different types of interactions (e.g., different user input signals). Each interaction may relate to a particular user input, such as forwarding a message (e.g., select a "retweet" input in association with a Twitter social messaging computing system), activating a link, specifying a favorable response (e.g., select a "like" input), and the like. As another example, a value of engagement may be computed as a number of interactions per unit time, per number of electronic message accesses (e.g., impressions), or any other parameter. Values of engagement may be determined in any way based on message interactions. Further, performance metric value characterizer 237 may be configured to compute impressions, reach, clickthroughs, a number of times a message is forwarded, etc. According to various examples, performance metric value characterizer 237 may be configured to analyze a corpus of electronic messages stored in repositories 242 and 244 to derive one or more of the above-mentioned performance metrics for each of a subset of words or other components.

Diagram 200 further depicts performance management platform 260 including a message generator 262 configured to generate messages, and a performance metric adjuster 264 configured to adjust or modify a value of a performance metric by, for example, replacing a component in exchange, for example, with another component (e.g., a synonym) having a greater value for the performance metric. According to some examples, performance data repository 246 may include various sets of performance criteria with which to guide formation of an electronic message. For example, a component of an electronic message being generated may be associated with a value that is predicted to be noncompliant with at least one performance criterion (e.g., a certain desired level of performance over a period of time). Thus, performance metric adjuster 264 may be configured to identify one or more actions that may adapt the electronic message so as to conform to the performance criteria. For example, a subset of performance criteria may be selected to evaluate generation of electronic message, whereby the subset of performance criteria may specify that a relatively high engagement value is a goal to attain within a relatively short window of time. In this case, a user (e.g., a marketer) may be interested in a quick spike in engagement followed by another electronic message. Thus, a sustainable engagement rate over a longer period of time may not be desired. Consequently, performance metric adjuster 264 may identify, for example, synonyms that have been characterized as having performance levels that may conform to the desired performance criteria (i.e., a relatively high engagement value to be obtained within a relatively short window of time). Some synonyms, such as those associated with moderate engagement values that sustain over longer periods of time, may be excluded for implementation in this example.

Publication transmitter 266 may be configured to generate any number of platform-specific electronic messages based on an adapted electronic message. Thus, publication transmitter 266 may generate an electronic message or content formatted as, for example, a "tweet," a Facebook™ post, a web page update, an email, etc.

Figure 3:
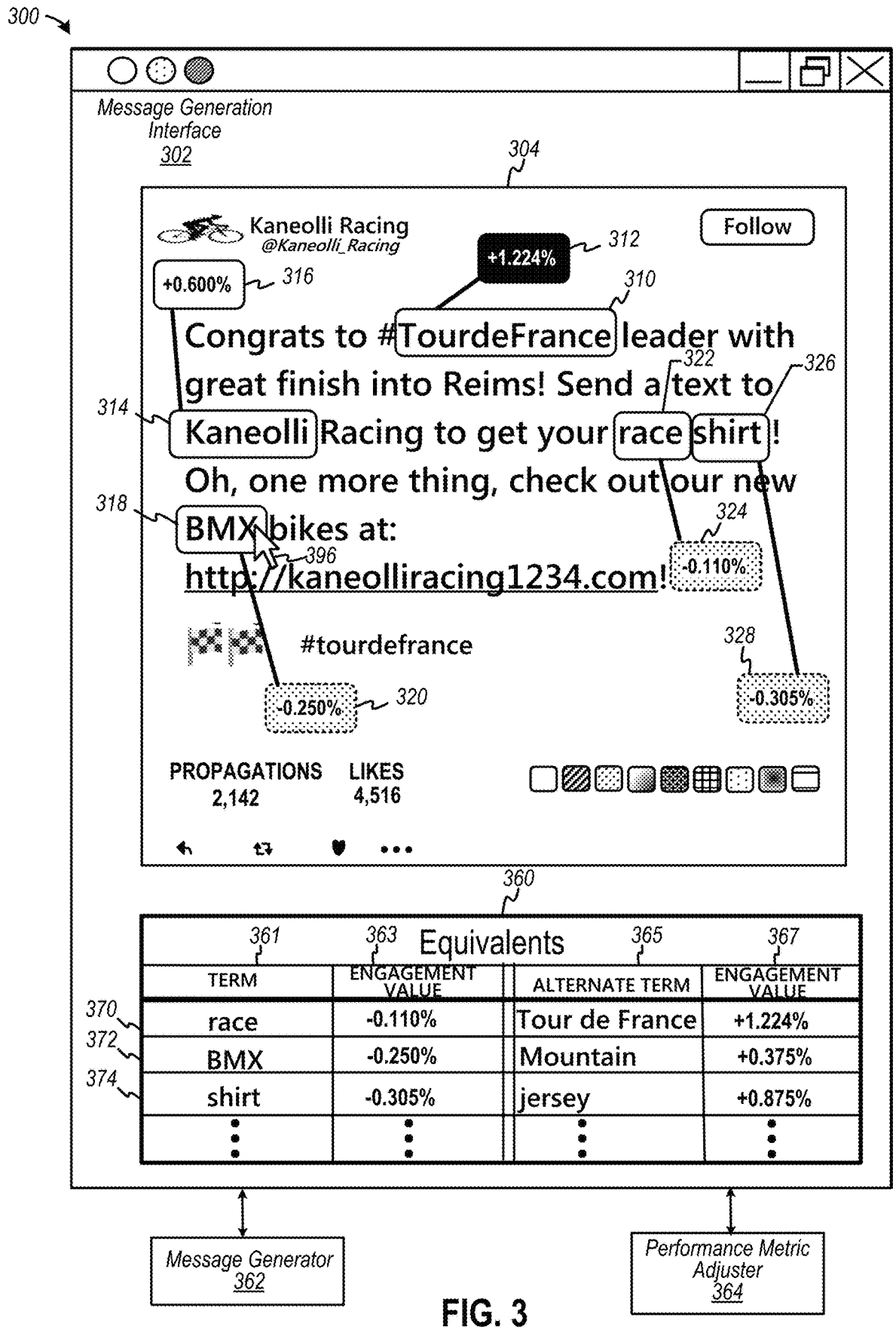
FIG. 3 is a diagram of an example of a user interface depicting adaption of an electronic message during generation, according to some embodiments.

FIG. 3 is a diagram of an example of a user interface depicting adaption of an electronic message during generation, according to some embodiments. Diagram 300 depicts a message generator 362 be configured to present a message generation interface 302 (e.g., as a user interface) with which to generate an electronic message 304. In the example shown, a user having an electronic social media account identified as "Kaneolli Racing" is generating electronic message 304 with at least text as content. One of the purposes of electronic message 304 may include promoting Kaneolli Racing (e.g., offering a racing shirt during a European bike race). Kaneolli Racing is a purveyor of racing bicycles, as well as other bicycles, such as mountain bikes, BMX bikes, etc. During or after creation of a proposed electronic message 304, performance metric adjuster 364 may be configured to identify components, such as words, that may have equivalent terms (or other substitutable terms) that may replace or augment words to predictively enhance a performance level of electronic message 304 prior to publishing. In one or more implementations, elements depicted in diagram 300 of FIG. 3 may include structures and/or functions as similarly-named or similarly-numbered elements depicted in other drawings.

In the example shown, message generator 362 generates a graphic representation ("+1.224%") 312 indicative of a level of performance associated with a term ("TourdeFrance") 310. In this example, the values of engagement are depicted as values of a performance metric. Similarly, message generator 362 generates graphic representation ("+0.600%") 316 indicative of a level of performance associated with a word ("Kaneolli") 314, graphic representation ("−0.110%") 324 indicative of a level of performance associated with a word ("race") 322, graphic representation ("−0.305%") 328 indicative of a level of performance associated with a word ("shirt") 326, and graphic representation ("−0.250%") 320 indicative of a level of performance associated with a word ("BMX") 318. Hence, words 310 and 314 predictively may enhance engagement for electronic message 304, whereas words 318, 322, and 326 may degrade or impair engagement of the message. Graphic representations 312, 316, 328, and 320 may be examples of visual indicators, according to some implementations.

As for predicted low-performing words 318, 322, and 326, diagram 300 depicts an arrangement 360 of equivalent terms and corresponding performance metrics that may be used to replace one or more of words 318, 322, and 326. In some examples, arrangement 360 may be a data structure stored in, for example, a performance data repository 146 of FIG. 1. Arrangement 360 need not be presented on message generation interface 302, and an equivalent term and performance metric value may be presented (not shown) if a user navigations a user input selector device 396 over a graphical representation of interest. As shown, cursor 396 transits to or near word 318, and, in response, a graphical representation depicting equivalent term ("mountain") 365 and corresponding engagement value ("+0.375%") 367 may be displayed (not shown). Thus, a user may select to replace the term "BMX" with the term "mountain," as mountain may be a suitable replacement that is associated with a greater engagement value. In some examples, performance metric adjuster 364 may automatically replace term "BMX" with the term "mountain," and may optionally replace other terms should higher performance equivalent terms be available.

In some cases, arrangement 360 may be displayed as a portion of message generation interface 302. As shown, lower performing words 318, 322, and 326 may be included as terms 361 in respective rows 370, 372, and 374. Engagement values depicted in graphical representations 320, 324, and 328 are also shown as including as engagement values 363 in arrangement 360. Alternate equivalent terms 365, such as "Tour de France," "mountain," and "jersey," are shown to be associated with respective engagement values 367, such as +1.224%, +0.375%, and +0.875%. As the term "jersey" is associated with a greater engagement value than the term "shirt," the term jersey may be substituted to replace the term shirt in electronic message 304 to enhance performance of the message predictively.

Figure 4:
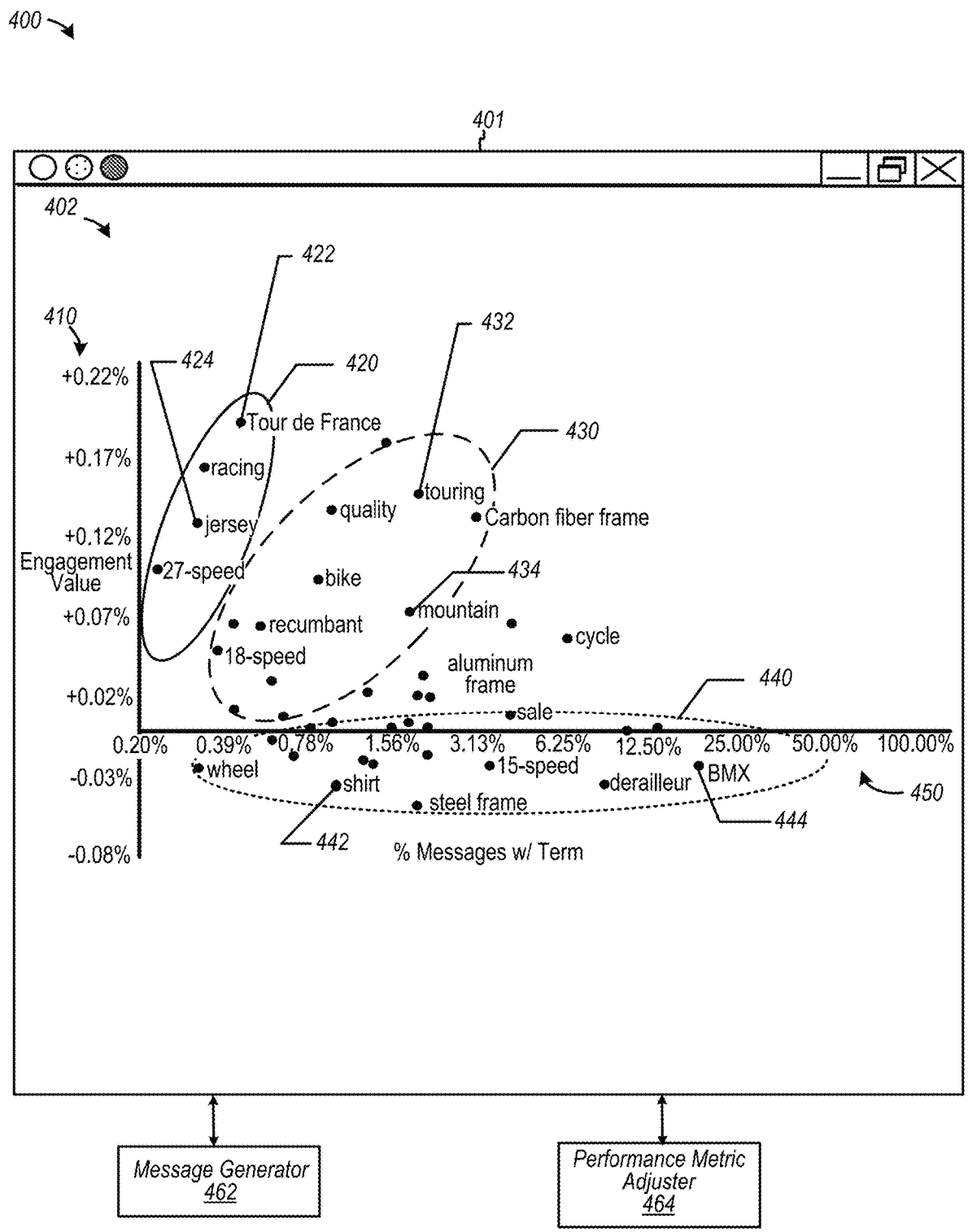
FIG. 4 is a diagram of an example of a user interface depicting adaption of an electronic message during generation, according to some embodiments.

FIG. 4 is a diagram of an example of a user interface depicting adaption of an electronic message during generation, according to some embodiments. Diagram 400 depicts a message generator 462 and a performance metric adjuster 464 configured to access performance metric data, such as engagement values 410. In the example shown, a number of terms, some of which may be equivalents, are depicted with a corresponding engagement value 410 and at a number of messages 450 that include the term (e.g., expressed as a percentage, %, of messages with a term). According to some examples, representation 402 depicts various groupings of terms that, while not required, may be presented via a user interface 401 to a user for identifying candidate equivalent terms and predictive effects (e.g., values of engagement) of using the equivalent terms. In one or more implementations, elements depicted in diagram 400 of FIG. 4 may include structures and/or functions as similarly-named or similarly-numbered elements depicted in other drawings.

In this example, representation 402 depicts at least categories of terms, which may be implemented as attributes, based on frequency 450 of mentioned terms and corresponding engagement rates 410. A first grouping 420 of terms includes message components having relatively effective (e.g., higher) engagement values, and have fewest numbers of mentions (e.g., used least in electronic messages). Grouping 420 includes terms "Tour de France" 422 and "jersey" 424. With fewest usages, performance metric adjuster 464 may be configured to automatically implement these terms to enhance engagement of electronic messages with these terms. A second grouping 430 of terms includes message components having moderately effective engagement values, and have moderate numbers of mentions (e.g., used moderately in electronic messages). Grouping 430 includes terms "touring" 432 and "mountain" 434. With moderate usages, performance metric adjuster 464 may be configured to automatically continue to implement these terms to continue sustaining engagement of electronic messages with these terms. A third grouping 440 of terms includes message components having least effective engagement values, and these terms have a range of numbers of mentions in electronic messages. Grouping 440 includes terms "shirt" 442 and "BMX" 444. In some examples, performance metric adjuster 464 may be configured to automatically deemphasize usage of these terms to reduce risks of encumbering the enhancement of engagement values for the electronic messages. By analyzing language patterns expressed representation 402, users (e.g., marketers) can test different tactics to monitor responses of using particular words or message components.

Figure 5:
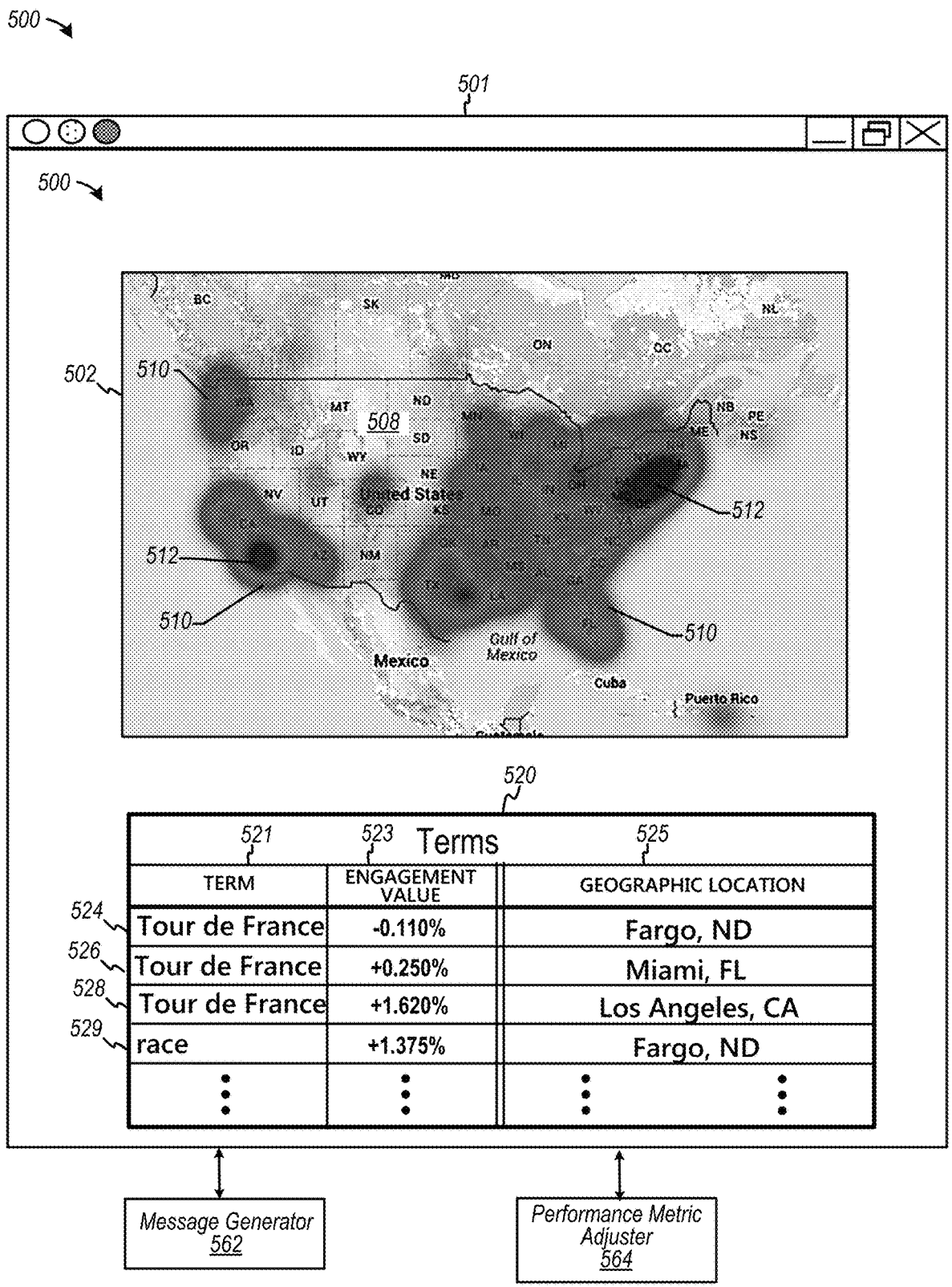
FIG. 5 is a diagram of an example of identifying performance metrics relative to a geographic location for an electronic message during generation, according to some embodiments.

FIG. 5 is a diagram of an example of identifying performance metrics relative to a geographic location for an electronic message during generation, according to some embodiments. Diagram 500 depicts a message generator 562 and a performance metric adjuster 564 configured to enhance performance of an electronic message based on, for example, performance metric values as a function of geographic location. According to some examples, performance metric values of equivalent terms may vary, too, as a function of geographic location. To illustrate, consider an example in which user interface 500 depicts a graphical representation 502 of various geographical locations at which a performance metric, such as engagement, for a message component varies. In this example, light shading, such as at geographic locations 508 (including Fargo, N. Dak.) may have relatively lower values of engagement for a term "Tour de France." In moderately-shaded areas that include geolocations 510, the term "Tour de France" may have a relatively moderate range of engagement values for the term "Tour de France," whereas in darkly-shaded areas that include geographic locations 512, the term "Tour de France" may have relatively higher engagement values. In one or more implementations, elements depicted in diagram 500 of FIG. 5 may include structures and/or functions as similarly-named or similarly-numbered elements depicted in other drawings.

Data arrangement 520 depicts increasing values of engagement 523 for term 521 from geolocations 525 ranging from Fargo, N. Dak. (e.g., in geographic regions 508) to Miami, Fla. (e.g., in geographic regions 510), and Miami Fla. to Los Angeles Calif. (e.g., in geographic regions 512). In some cases, performance metric adjuster 564 may use the term "Tour de France" in row 528 when an electronic message is configured to target recipients in Los Angeles. However, an equivalent term "race" in row 529 may yield greater engagement values when used in electronic messages targeted to recipients in Fargo, N. Dak., rather than using the term "Tour de France" in row 524. As such, performance metric adjuster 564 may be configured to automatically implement the term "race" when propagating electronic message to North Dakota rather than using terms and corresponding engagement values in rows 524, 526, and 528.

Figure 6:
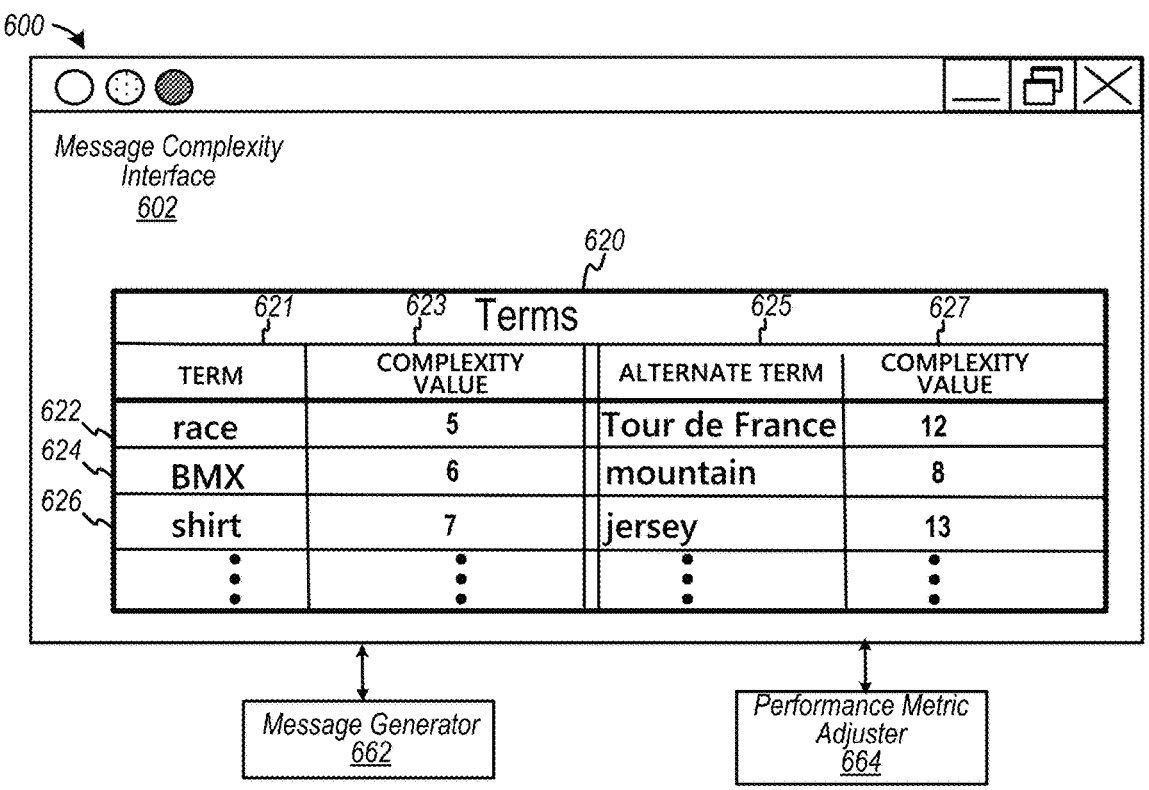
FIG. 6 is a diagram of an example of identifying a level of complexity of components for an electronic message during generation, according to some embodiments.

FIG. 6 is a diagram of an example of identifying a level of complexity of components for selecting a component in an electronic message during generation, according to some embodiments. Diagram 600 depicts a message generator 662 configured to generate a message complexity interface 602, and a performance metric adjuster 664 configured to generate an electronic message including one or more components having values associated with performance metric values compliant with performance criteria. For example, performance criteria for an electronic message may specify a reading level associated with targeted recipients of the message. Hence, performance metric adjuster 664 may identify a message component, such as a term 621 (e.g., "race," "BMX," or "shirt") that may be less compatible that an alternative term 625 (e.g., "Tour de France," "Mountain," or "jersey"). In one or more implementations, elements depicted in diagram 600 of FIG. 6 may include structures and/or functions as similarly-named or similarly-numbered elements depicted in other drawings.

According to the example shown in data arrangement 620, terms 621 in rows 622, 624, and 626 may have corresponding complexity values 623, such as "5," "6," and "7," whereas alternate terms 625 may have corresponding complexity values 627 (e.g., "12," "8," and "13"). Note that a complexity level of a message component, such as a word, may relate to a reading level based on, for example, the Gunning Fog Index, which is an approach for estimating a number of years of formal education. Other techniques for describing a level complexity beyond the Gunning Fog Index may be used in various implementations. According to some examples, logic in an electronic message performance management platform may be configured to analyze content of a sample of electronic messages of a subpopulation of recipients to determine one or more reading levels. The subpopulation of recipients that are most likely to be responsive to a generated electronic message may be at least one group to target. As such, performance metric adjuster 664 may be configured to substitute out, for example, the word "Tour de France" having a reading level (or level of complexity) of "12," whereas a targeted subpopulation of recipients may be described as having a reading level of "7." Thus, the term "race," which is associated with a reading level of "5" may be more appropriate and comprehendible by recipients associated with a reading level of 7.

In one example, logic in an electronic message performance management platform may be configured to characterize a word as a portion of the electronic message to form a characterized word including a characteristic. In some examples, a characteristic may include a level of complexity for a word (e.g., "Tour de France"), the level of complexity being indicative of a reading level. Hence, the logic may be configured to identify a reading level associated with a subpopulation of recipient computing devices of an electronic message, and to identify another word (e.g., "race") having a different level of complexity (e.g., a lower level) relative to the level of complexity for the word "Tour de France." Then, the logic may be configured to embed word "race" into the electronic message to form an adapted electronic message for a targeted subpopulation of recipient computing devices.

Figure 7:
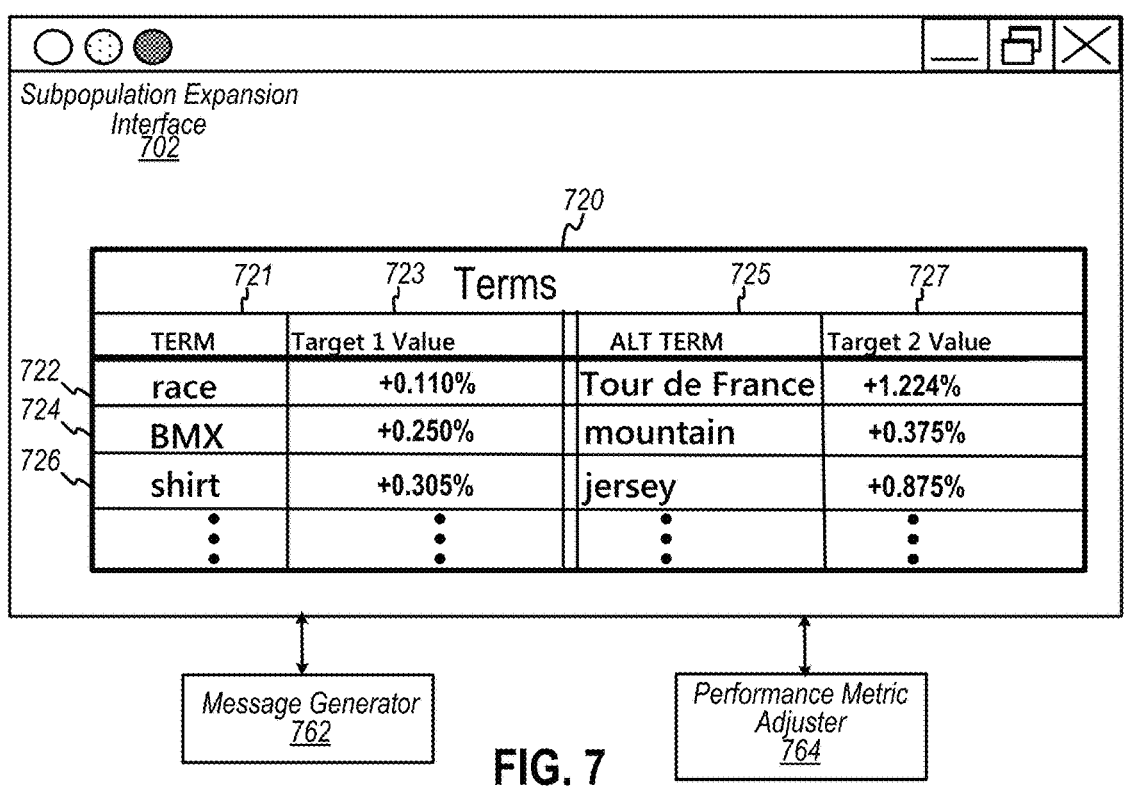
FIG. 7 is a diagram of an example of identifying sub-population-dependent components for an electronic message during generation, according to some embodiments.

FIG. 7 is a diagram of an example of identifying subpopulation-dependent components for an electronic message during generation, according to some embodiments. Diagram 700 depicts a message generator 762 configured to generate a subpopulation expansion interface 702 configured to expand a reach of an electronic message by targeting a particular subpopulation of recipients. Diagram 700 also depicts a performance metric adjuster 764 configured to adjust a performance metric value by, for example, selecting an equivalent term (e.g., alternative term) to calibrate a level of performance of a word to a particular subpopulation for which an electronic message is being generated. In one or more implementations, elements depicted in diagram 700 of FIG. 7 may include structures and/or functions as similarly-named or similarly-numbered elements depicted in other drawings.

In the example shown, data arrangement 720 includes a subset of terms 721 corresponding to performance metric values 723 for a first targeted subpopulation, whereas another subset of alternate terms 725 correspond to performance metric values 725 for a second targeted subpopulation. According to various examples, the two targeted subpopulations may differ from each other by demographics, purchasing behaviors, incomes, or any other characteristic. A set of performance criteria may define how best to generate electronic messages for optimizing engagement based on the subpopulation. Consequently, performance metric adjuster 764 may be configured to modify or adapt a word of an electronic message so as to more precisely generate electronic messages that may yield a predictive amount of engagement or other performance metrics. In at least one case, identifying subpopulation-dependent components may facilitate the enhancement of values of a performance metric to increase levels of engagement.

Figure 8:
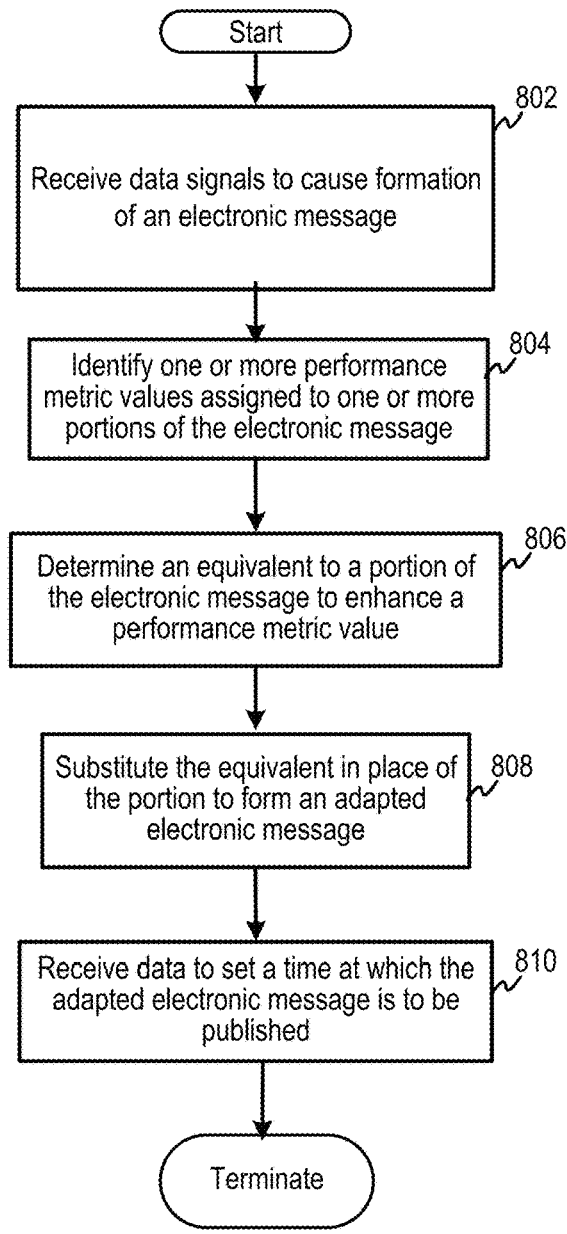
FIG. 8 is a flow diagram as an example of generating an adapted electronic message, according to some embodiments.

FIG. 8 is a flow diagram as an example of generating an adapted electronic message, according to some embodiments. Flow 800 may be an example of modifying one or more components of an electronic message to enhance one or more performance metric values. At 802, data signals to cause formation of an electronic message may be received from, for example, a user interface. In some cases, the data signals are received into an electronic message performance management platform. At 804, one or more performance metric values, such as engagement values, may be assigned to one or more portions (e.g., one or more words) of an electronic message. The values of a performance metric may be identified at 804. At 806, an equivalent component (e.g., a synonym or any other compatible term or component) may be determined to enhance (e.g. optimize) a rate of transmission or propagation of an electronic message. At 808, an equivalent term may be substituted in place of initial term, thereby forming an adapted electronic message. At 810, data may be received to set a scheduled time at which the adapted electronic message may be published. For example, a user may schedule a publishing of an adapted electronic message at a scheduled time during which a subset of recipients have demonstrated frequent engagement activities relative to other time periods.

Figure 9:
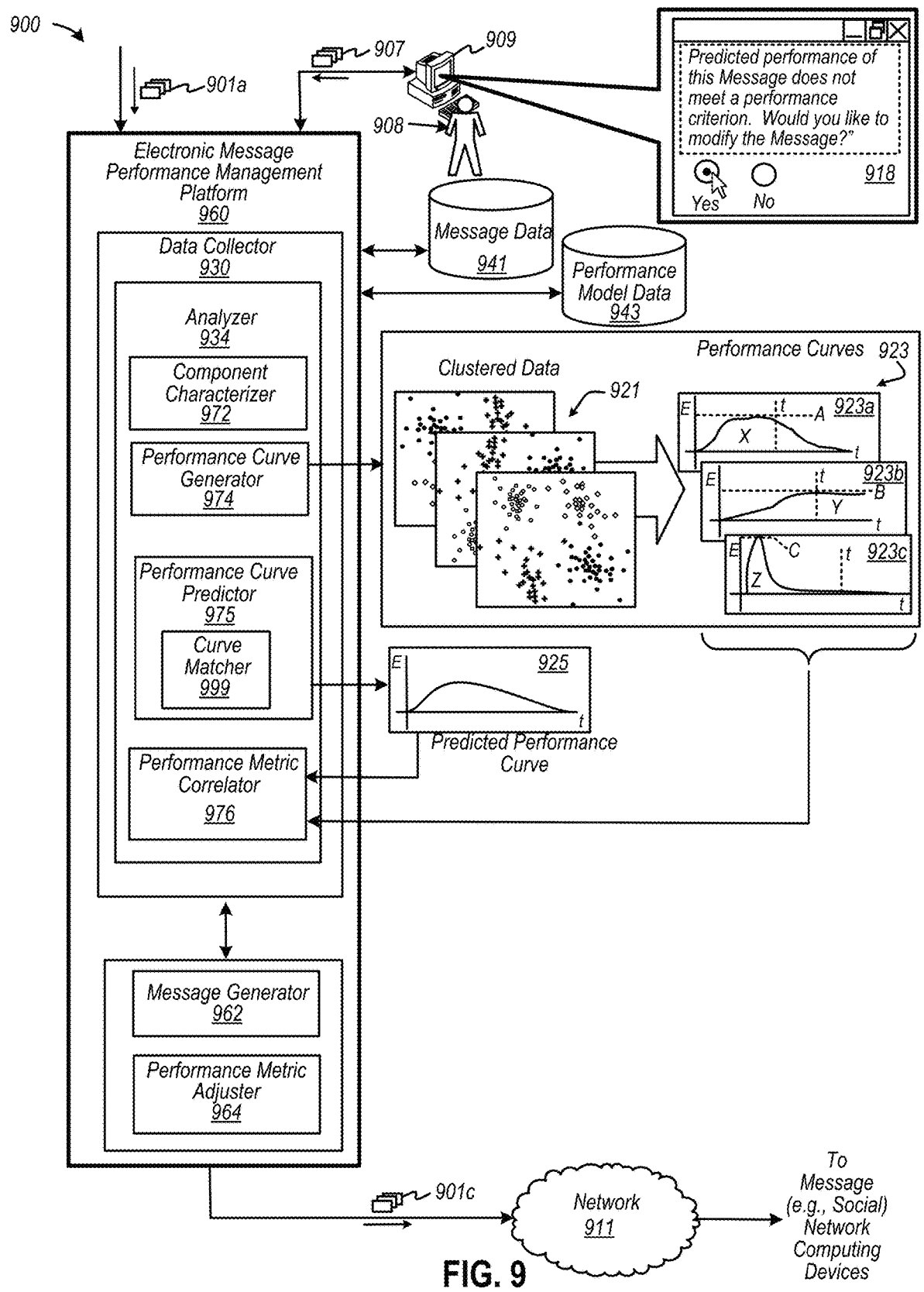
FIG. 9 is a diagram depicting an example of an electronic message performance management platform configured to harvest and analyze electronic messages, according to some examples.

FIG. 9 is a diagram depicting an example of an electronic message performance management platform configured to harvest and analyze electronic messages, according to some examples. Diagram 900 includes a performance management platform 960 including a data collector 930, a message generator 962, and a performance metric adjuster 964. Further, data collector 930 is shown to include an analyzer 934, which, in turn, includes a component characterizer 972, a performance curve generator 974, a performance curve predictor 975, and a performance metric correlator 976, any of which may be implemented in hardware or software, or a combination of both. In one or more implementations, elements depicted in diagram 900 of FIG. 9 may include structures and/or functions as similarly-named or similarly-numbered elements depicted in other drawings.

Analyzer 934 may be configured to data mine and analyze relatively large number of datasets with hundreds, thousands, millions, etc. of data points having multiple dimensions and attributes. Further, analyzer 934 may be configured to correlate one or more attributes to one or more performance metric values so that implementation of a component of an electronic message may be predicted to cause a predicted level of performance, according to some examples. For example, analyzer 934 may be configured to identify a subset of terms that may be used, as synonyms, to replace a word to predictably increase or enhance a performance metric value of a word as well as an electronic message including the word.

Component characterizer 972 may be configured to receive data 907 representing a proposed electronic message and data 901a representing electronic messages and any other selected source of data from which components (e.g., words, phrases, topics, etc.) of one or more subsets of electronic messages (e.g., published messages) may be extracted and characterized. In some examples, component characterizer 972 may be configured to identify attributes with that may be characterized to determine values, qualities, or characteristics of an attribute. For instance, component characterizer 972 may determine attributes or characteristic that may include a word, a phrase, a topic, or any message attribute, which can describe the component. A message attribute may include metadata that describes, for example, a language associated with the word (e.g., a word is in Spanish), or any other descriptor, such as a synonym, a language, a reading level (e.g., a level of complexity), a geographic location, and the like. Message attributes may also include values of one or more performance metrics (e.g., one or more values of engagement, impressions, etc.). In some examples, component characterizer 972 may implement at least structural and/or functional portions of a message component attribute determinator 235 of FIG. 2.

Performance curve generator 974 may be configured to statistically analyze components and attributes of electronic messages to identify predictive relationships between, for example, an attribute and a predictive performance metric value. In this example, a subset of predictive performance metric values associated with one or more attributes may be described as a "performance curve." According to some examples, a performance curve may include data representing a value of a performance metric as a function of time (or any other metric or parameter). For example, a performance curve associated with one or more attributes may specify an amount of engagement (e.g., an engagement value) as a function of time (e.g., a point in time after an electronic message is published). According to some embodiments, performance curve generator 974 may be configured to classify and/or quantify various attributes by, for example, applying machine learning or deep learning techniques, or the like. In one example, performance curve generator 974 may be configure to segregate, separate, or distinguish a number of data points representing similar (or statistically similar) attributes, thereby forming one or more clusters 921 of data (e.g., in 3-4 groupings of data). Clustered data 921 may be grouped or clustered about a particular attribute of the data, such as a source of data (e.g., a channel of data), a type of language, a degree of similarity with synonyms or other words, etc., or any other attribute, characteristic, parameter or the like. While any number of techniques may be implemented, performance curve generator 974 may apply "k-means clustering," or any other known clustering data identification techniques. In some examples, performance curve generator 974 may be configured to detect patterns or classifications among datasets and other data through the use of Bayesian networks, clustering analysis, as well as other known machine learning techniques or deep-learning techniques (e.g., including any known artificial intelligence techniques, or any of k-NN algorithms, regression, Bayesian inferences and the like, including classification algorithms, such as Naïve Bayes classifiers, or any other statistical or empirical technique).

Performance curve generator 974 also may be configured to correlate attributes associated with a cluster in clustered data 921 to one or more performance curves 923 based on, for example, data in message data repository 941 that may represent any number of sample sets of data from electronic messages. According to some embodiments, a "performance curve" may represent performance of one or more message components (e.g., one or more words or terms), or attributes thereof, such that a message component, if used, may influence or otherwise contribute to enhancing a value of a performance metric, such as an engagement rate. For example, a term "Tour de France" may be determined to generate a certain engagement value per unit time. In some examples, a performance curve 923a for the term "Tour de France" may represent an influence of the term as a function of time, t. Here, a value of engagement (whether determined empirically or predictively) may vary relative to time, t, in which a level of engagement may reach a value "A" during time "t" such that, cumulatively, the term "Tour de France" may have a total cumulative engagement of "X" (e.g., an area under the curve shown). In another example, the term "Tour de France," or its synonym, may give rise to a performance curve 923b. In this case, a level of engagement may reach a value "B" during and after time "t" such that, cumulatively, the term "Tour de France" may have a total cumulative engagement of "Y," which may provide a maximal, sustainable engagement rate over a longer period of time (e.g., slowly increasing to time "t" and maintaining a value "B" over time). Alternatively, in yet another example, the term "Tour de France" may provide for a performance curve 923c in which a level of engagement may quickly reach a value "C," which is greater than values "A" and "B" during after time "t." Thus, while performance curve 923c may indicate a performance metric quickly can reach a large value of engagement, subsequent values of performance curve 923c indicate a relatively steep reduction in engagements, with less cumulative total engagements (e.g., Z) than performance curves 923a (e.g., X) and 923b (e.g., Y). Performance curves 923a, 923b, and 923c are non-limiting examples in which one or more message components may be used to predict future performance of a published electronic message. In some cases, a marketer may select a performance curve 923 with which to publish an electronic message.

Further, performance management platform 960 may be configured to generate any number of performance curves 923 associated with any of one or more message components. Consequently, a user 908 may generate a proposed electronic message at user computing device 909, which, in turn, may provide an electronic message and its components to performance management platform 960 for analysis. In some cases, an application associated with computing device 909 may specify, in a user interface 918, that a predicted performance metric value for a particular component or message may not meet particular performance criteria. As such, user 908 may provide a user input with user interface 918 to enhance one or more performance metrics, as set forth in data 907. In some examples, one or more performance curves 923 may be generated based on, for example, cluster analysis, curve matching, or any other known analytical techniques to characterize clustered data, according to some embodiments.

In accordance with various examples, a user 908 may wish to generate an electronic message for publication that is designed to meet certain values of performance metrics and the like. In the example shown, performance curve predictor 975 may be configured to receive data 907, which may include contents (e.g., components, such as text, video, audio, etc.) of a proposed electronic message. During, or subsequent to, a message generation process, performance curve predictor 975 may be configured to generate a predicted performance curve 925 based on the proposed electronic message and its components, such as electronic message 304 of FIG. 3, to determine one or more performance metric values associated with a newly-generated electronic message. In at least one example, performance curve 925 may be compared against other performance curves 923 to determine a correlation between a proposed electronic message 907 and an archived corpus of messages. As such, a curve matcher module 999 may be configured to match predicted performance curve 925 against performance curves 923a, 923b, and 923c to identify one or more sets of message components that may be associated with performance curve 925.

In one embodiment, a specific performance curve 923 may be relatively close to predicted performance curve 925. Curve matcher 999 may be configured to determine which of performance curves 923a to 923c may be most relevant to an electronic message 907. In some cases, curve matcher 999 is configured to perform curve matching or curve fitting algorithms to identify associated attributes. For example, if curve matcher 999 identifies performance curve 923b as most relevant, then curve matcher 999 may be configured to identify message components contributing to performance curve 923b so that a pending message may be adapted to use those message components. As such, an electronic message incorporating adapted components may be used to transmit or convey a message at a rate of transmission or propagation, as described herein.

Message generator 962 may be configured to generate a message based on user input, as well as information provided by performance metric correlator 976, which may be configured to identify subsets of message components (e.g., words, topics, etc.) for generating an electronic message that comports to one or more performance criteria. Performance metric adjuster 964 is configured to adapt one or more components or words of an electronic message by adjusting performance metric for an electronic message by modifying or a placing a particular term. Thereafter, an electronic message may be formatted in transmitted as data 901c via networks 911 to any number of social media network computing devices.

Figure 10:
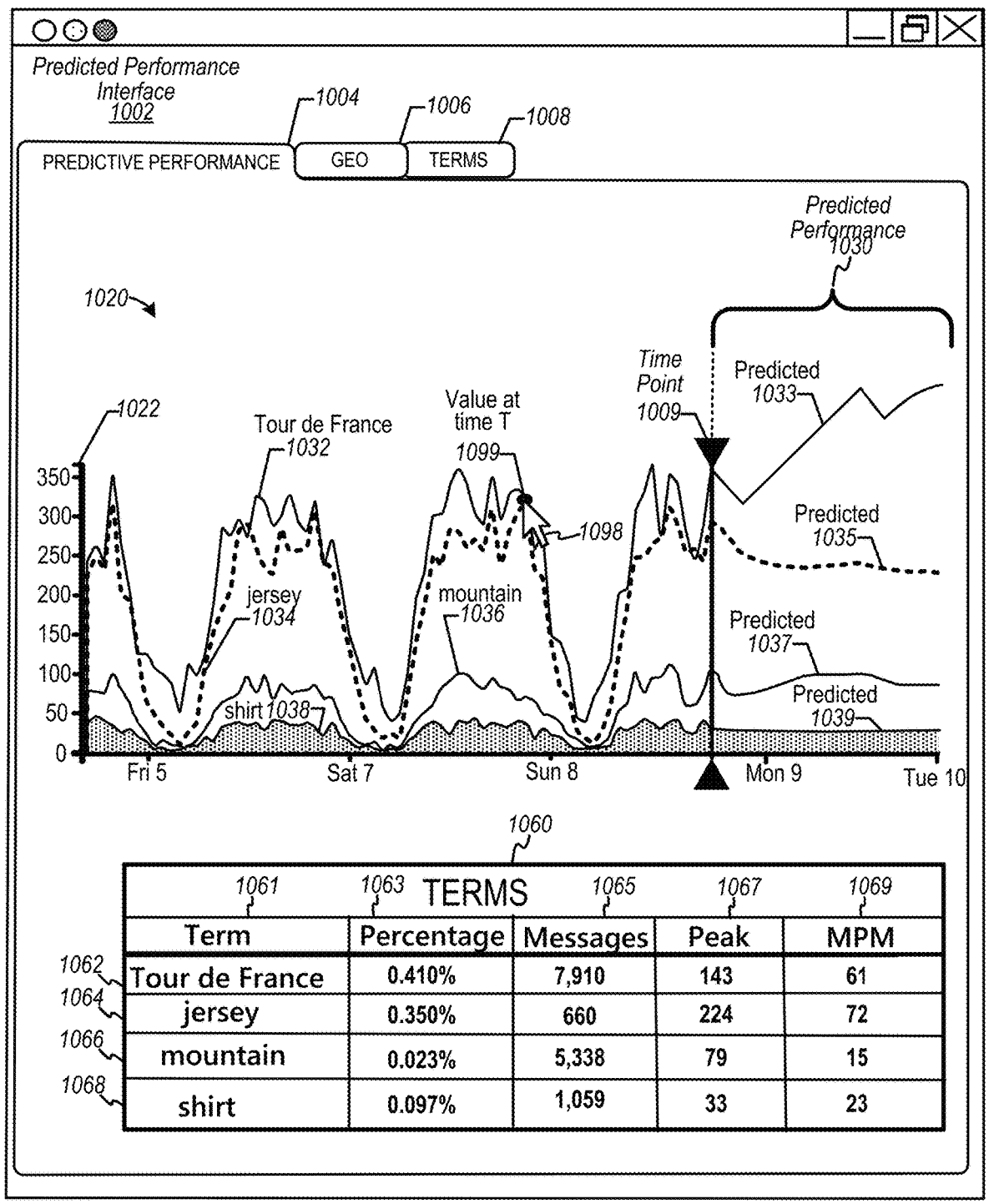
FIG. 10 is a diagram depicting an example of a user interface configured to accept data signals to identify and modify predicted performance of a message component, according to some examples.

FIG. 10 is a diagram depicting an example of a user interface configured to accept data signals to identify and modify predicted performance of a message component, according to some examples. Diagram 1000 includes a user interface 1002 configured to depict or present data representing "predictive performance" 1004, data representing "geographic location" 1006, and data representing "terms" (as message components) set forth in tab 1008. As shown, interface 1002 depicts a graphical representation 1020 of various performance metric values, a function of time, for one or more terms. As shown, a term "Tour de France" 1032 is shown to have variable values of a performance level metric, such as engagement 1022, relative to time. Further, a term "jersey" 1034, a term "mountain" 1036, and a term "shirt" 1038 are also depicted as having variable magnitudes of a performance over a period of time, until time point at 1009. In some cases, time point at 1009 may refer to a present point in time, according to some examples, at which a user or computing device is monitoring performance of a published electronic message.

According to some examples, user interface 1002 may be configured to present predicted performance values 1030 over a number of message components or words. Further to diagram 1000, predicted performance values 1030 may include predicted values 1033 of the term "Tour de France," predicted values 1035 of the term "jersey" 1034, predicted values 1037 of the term "mountain" 1036, and predicted values 1039 of the term "shirt" 1038. Therefore, user interface 1002 may be configured to present graphical representations of predicted performance values 1030 in a user interface. Should one of predicted performance values 1030 be determined to be less desired, a user may modify a term of the electronic message to ensure performance criteria are met.

Also, a user may monitor performance of one or more of message components in real-time (or near real-time) to determine whether an electronic message, such as a post to a website, is performing as expected (e.g., in accordance with one or more performance metric criteria). As shown, user may select an engagement value 1099 at a time point, T, via user input selector 1098 to identify the performance of the term "Tour de France" at time point T. In some examples, data arrangement 1060 may be displayed responsive to selecting time point T, whereby data arrangement 1060 may present various performance metrics at a particular point in time. Data arrangement 1060 may be presented to convey that a particular term 1061 may be associated with performance metrics 1063, 1065, 1067, or 1069. For example, each term in respective rows 1062, 1064, 1066, and 1068 may be associated with an engagement metric 1063, a number of messages 1065, a peak number of messages 1067, and a number of messages transmitted (or interacted with) per minute ("MPM") 1069.

Figure 11:
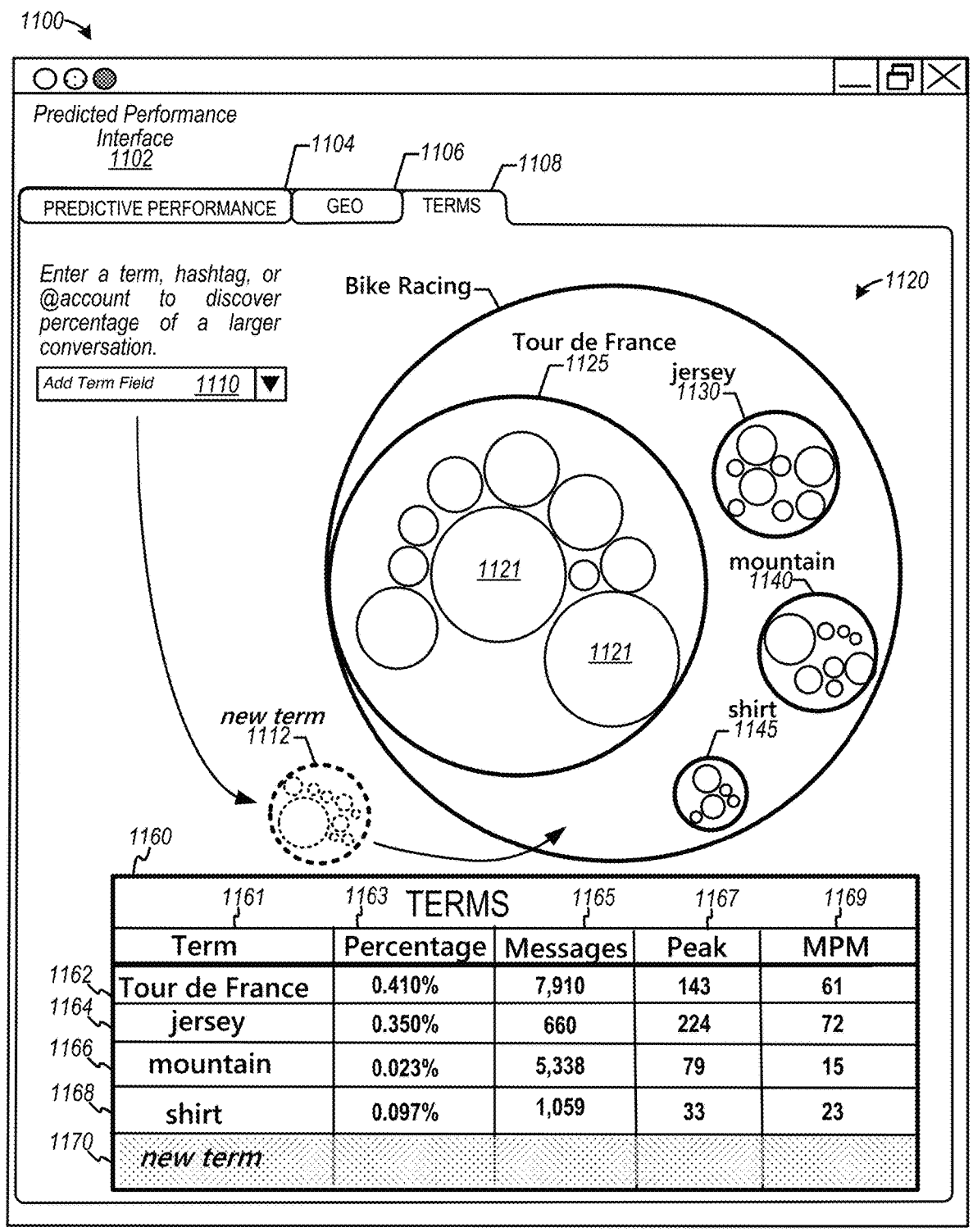
FIG. 11 is a diagram depicting an example of a user interface configured to accept data signals to visually convey a predicted performance of a message component, according to some examples.

FIG. 11 is a diagram depicting an example of a user interface configured to accept data signals to visually convey a predicted performance of a message component, according to some examples. Diagram 1100 includes a user interface 1102 configured to depict or present data representing "predictive performance" 1104, data representing "geographic location" 1106, and data representing "terms" (as message components) set forth in tab 1108.

As shown, interface 1102 depicts a graphical representation 1120 of various performance metric values and visually-identifiable magnitudes of the values of a performance metric, such as an engagement rate. As shown, term "Tour de France" 1125, "jersey" 1130, "mountain 1140," and "shirt" 1145 may be presented as synonyms or related terms to a topic "bike racing" (e.g., for purposes of substituting one or more terms for each other to enhance performance). In diagram 1100, term "Tour de France" 1125 is shown to have a relatively large circular size compared to the other terms. Therefore, in this case, the term "Tour de France" may have a relatively larger engagement value than the other terms presented. Each term 1125, 1130, 1140, and 1145 may be presented encapsulating smaller visual indicators 1121 (e.g., circles) that convey a subset of synonyms for each term.

Interface 1102 may also include a user input field 1110 to accept user input (e.g., a new term) to search, discover, and modify presentation of graphical representation 1120 by adding a visual indicator 1112 of a new term to "bike racing." In some cases, sizes of the visual indicators (e.g., circles) for terms 1125, 1130, 1140, and 1145 may be adjusted in size to accommodate the visual indicator 1112 of the new term. Further, interface 1102 may present data arrangement 1160 to convey that a particular term 1161 may be associated with performance metrics 1163, 1165, 1167, or 1169. For example, each term in respective rows 1162, 1164, 1166, and 1168 may be associated with an engagement metric 1163, a number of messages 1165, a peak number of messages 1167, and a number of messages transmitted (or interacted with) per minute ("MPM") 1169. Row 1170 may be generated to display corresponding performance metric values as new term 1112 is added to "bike racing."

Figure 12:
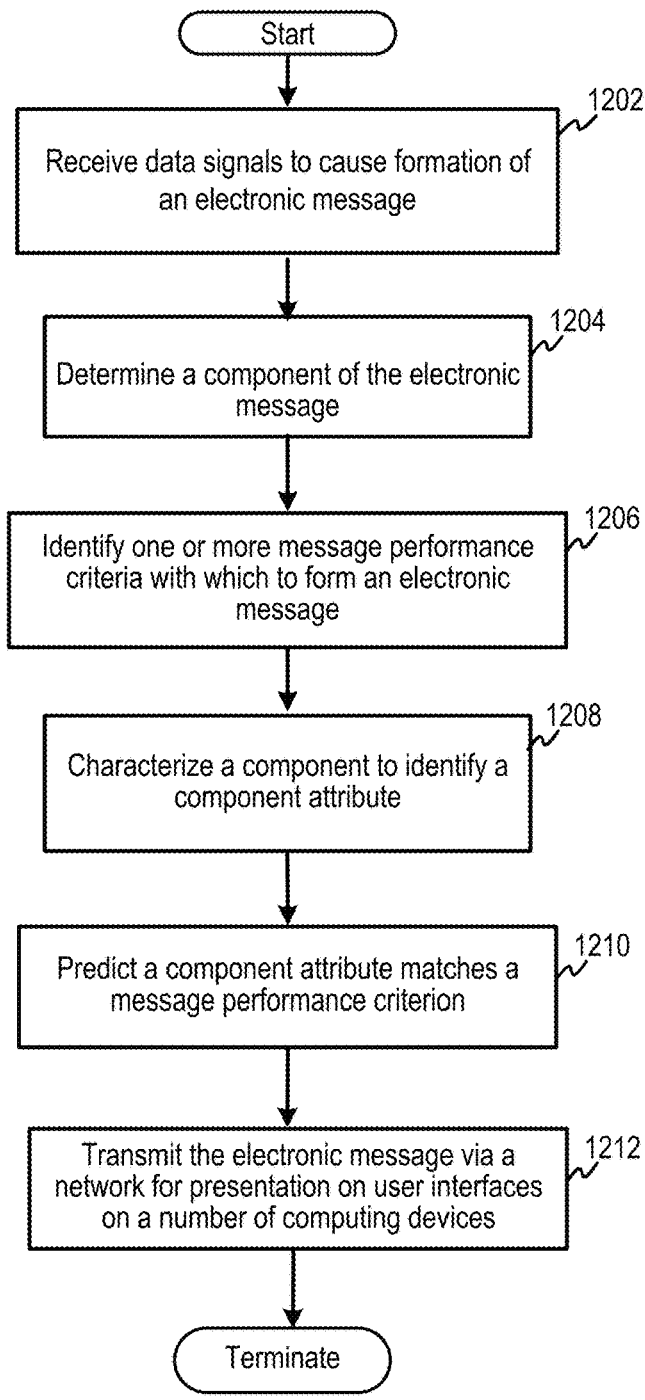
FIG. 12 is a flow diagram as an example of predicting performance metrics for an electronic message, according to some embodiments.

FIG. 12 is a flow diagram as an example of predicting performance metrics for an electronic message, according to some embodiments. Flow 1200 may begin at 1202, whereby data signals from a user interface may be received, for example, to initiate formation of an electronic message. In at least some examples, flow 1200 may be configured to guide generation of an electronic message based on whether predicted component attribute values comply with performance metric criteria. Performance metric criteria, for example, may include a threshold or a range of performance metric values that may be designed to test whether values of a monitored component characteristic or performance metric comply with a defined set of values (e.g., performance criteria). To illustrate, consider that a user may craft an electronic message for publication, whereby the user is concerned with longevity, or sustainability, of an electronic message to achieve a certain level of performance (e.g., a value of an amount of engagement) as a function of time. Thus, the user may be interested in generating electronic messages with components predicted to solicit sustainable amounts of engagement, rather than, for example, configuring an electronic message and contents to cause a relatively sharp rate, or spike, such that the amounts of engagement provide a rapid response. An example of the latter may be a massive "push" campaign designed to extend a reach over greater number of recipients in a relatively short duration (e.g., at high amounts of engagement) regardless of whether such performance levels are unsustainable for anything other than least a short duration of time.

At 1204, a component, such as a word, topic, or any other attribute, of an electronic message may be determined prior to publication. According to some examples, a component and/or its attributes may be characterized to identify a type or quantity (or value) associated with the component or attribute.

At 1206, one or more performance criteria for an electronic message may be identified, whereby a performance criterion may define whether formation of an electronic message is compliant with a value of the performance criterion. In some cases, a performance criterion may include data representing a value as a function of time. For example, a rate of engagement may increase during a first time period, and then may maintain a value within a range of engagement rate values during a second time period. At a third time period, a performance criterion may be used to determine whether the rate of engagement for an electronic message component is out of range or non-compliant. If non-compliant, a determination may be made whether to deactivate use or publication of an electronic message in favor of another electronic message. According to some embodiments, a set of values for a performance criterion or criteria may define a "performance curve," by which, for example, a predicted engagement value per unit time may comport with the curve. In some examples, identifying message performance criteria may include identifying a performance curve associated with at least one performance metric.

At 1208, a message component may be characterized to identify a component attribute, which may have a value that may be measured against a message performance criterion to identify a component attribute. At 1210, a value of a component attribute may be predicted to match at least one of the message performance criteria. In some examples, a value of a component characteristic may be predicted as a value of a "performance curve" in which a value of a performance metric, such as engagement, may vary as a function of time. Therefore, during generation of an electronic message, a performance management platform may be configured to characterize a component at 1206 and determine (e.g., predict) whether the component (or an attribute thereof) is associated with a performance metric value at 1208 that comports with a performance criterion. For example, if a component, such as a term "pizza" is associated with a particular engagement value based on "New York" as an geographic-related attribute, then logic in the performance management platform may compute whether an engagement value associated with the term "pizza" comports with an objective to publish an electronic message advertising "take-out food" in, for example, "Florida" in accordance with performance criteria.

Further to this example, a predicted value of engagement that may be analyzed after an electronic message is published to determine whether it comports with message performance criteria. For example, a monitored or computed component characteristic of +0.015% may be compared against a predicted engagement value of +0.750% over a duration of time "T," which is less than +0.750%. Thus, in this case, the predicted value of engagement (i.e., the characterized value of a component "pizza") may be determined to be non-compliant. In some examples, when a predicted value of a component characteristic (e.g., expressed as a performance metric) of an electronic message is predicted to be non-compliant, a performance management platform may be configured to activate one or more other actions. For example, a data repository may be accessed to identify an alternate component for the electronic message. An example of an alternate component is synonym. However, an alternate component and its attributes may be any type of parameter or attribute with which to select another component to enhance a predicted performance level of an electronic message. For instance, an alternate component attribute associated with an alternate component (e.g., another word or synonym) may be matched against message performance criteria to determine whether the use of the alternate component may be predicted to comply with message performance criteria. In some embodiments, curve matching or fitting techniques may be used to determine whether an alternate component attribute may match (i.e., comport) with a message performance criterion. At 1212, an electronic message may be transmitted via a network for presentation on a variety of user interfaces at any number of computing devices.

Figure 13:
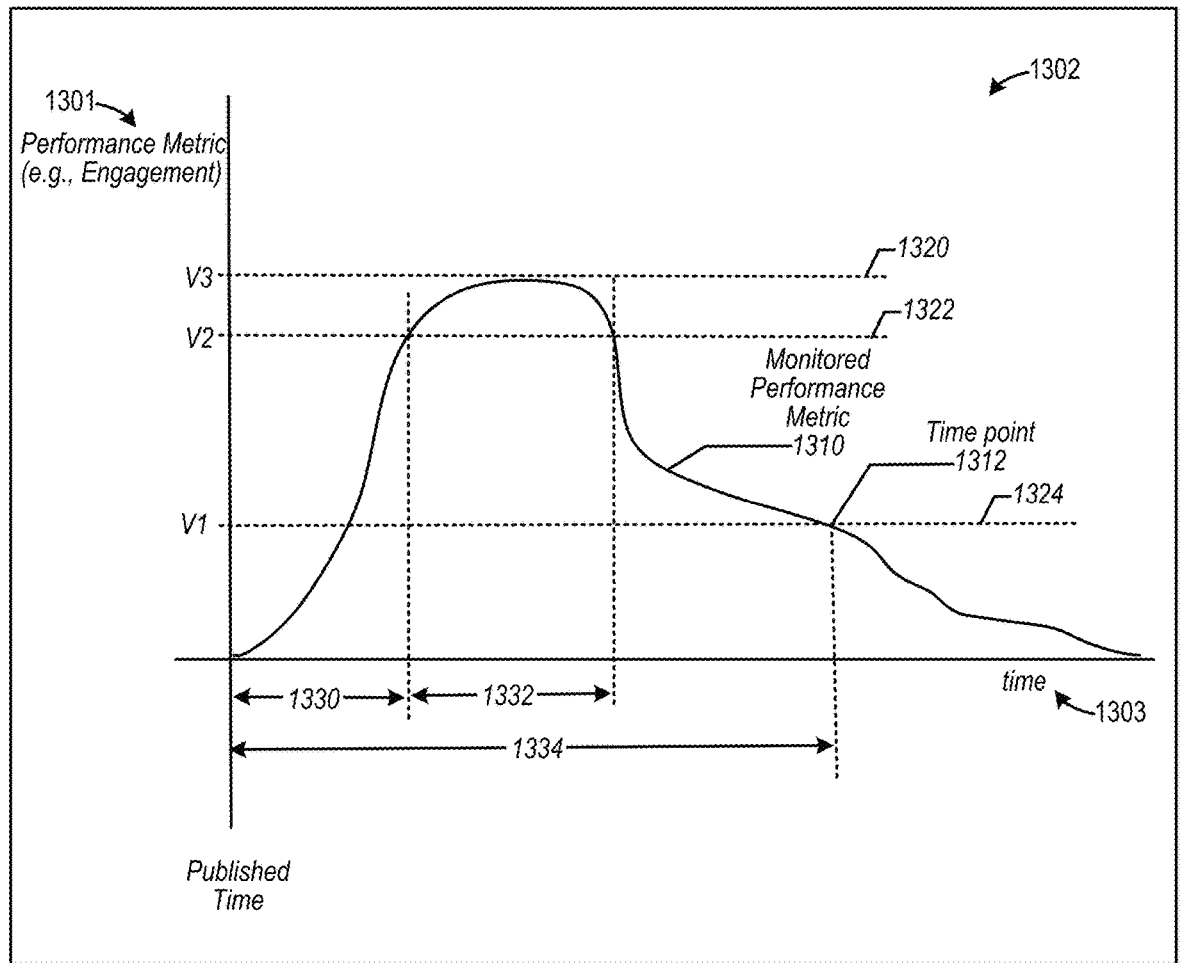
FIG. 13 is a diagram depicting an electronic message performance management platform implementing a publishing optimizer, according to some embodiments.
Figure 13:
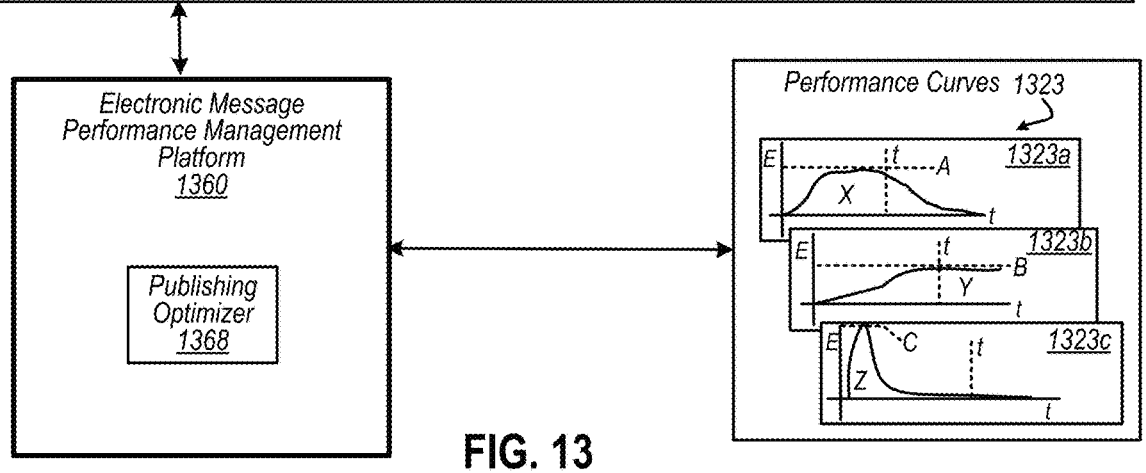

FIG. 13 is a diagram depicting an electronic message performance management platform implementing a publishing optimizer, according to some embodiments. Publishing optimizer 1368 may be configured to determine an effectiveness of an electronic message relative to one or more performance metrics and time. In some examples, publishing optimizer 1368 may monitor values of a performance metric against a performance criterion to determine when an effectiveness of an electronic message is decreasing or has reached a particular value. Responsive to determining reduced effectiveness, publishing optimizer 1368 may be configured to implement another electronic message, as one corrective action, or any other corrective action to ensure, for example, a particular set of content may sustainably propagate (e.g., through any number of multiple forwarding events, such as "retweets" or "shares" at desired rates of transmission and interactivity (e.g., engagement).

According to some examples, the electronic message performance management platform 1360 of FIG. 13 may be configured to monitor in real-time (or nearly in real-time) any number of performance metric values specifying whether a published electronic message is performing as predicted or otherwise expected. In some cases, a performance metric value, such as engagement rate, may be monitored with respect to a performance curve 1323, such as performance curves 1323*a*, 1323*b*, or 1323*c*. When a particular value of the performance metric is detected, a determination may be made as to whether an associated electronic message may be performing suboptimally (e.g., over time relative to a performance criterion) and whether a corrective action may be implemented (e.g., modifying the first published electronic message, publishing a second electronic message, etc.).

Diagram 1300 depicts one or more values of a performance metric 1301 and one or more points in time 1303 that may constitute performance criteria with which to judge or otherwise determine whether performance of a published electronic message may be complying with the performance criteria. If not, corrective action may be taken. During time interval 1330, a first performance criterion specifies that a value of engagement may be monitored against a desired engagement value, V2, 1322. Hence, if monitored performance metric 1310 fails to comply with desired engagement value, V2, 1322 during time interval 1330, then corrective action may be taken. A second performance criterion may specify a time interval 1332 during which a value of engagement is desired to sustain a value in a range between value ("V2") 1322 and value ("V3") 1320. Hence, if the valued of monitored performance metric 1310 is below this range, than the monitor performance metrics 1310 may be deemed noncompliant. A third performance criterion may specify a value ("V1") 1324 at which monitored performance metric 1310 is deemed minimally effective or ineffective. So, if monitored performance metric 1310 is detected to have a value ("V1") 1324 at time 1334, then the published electronic message may be deemed suboptimal. Corrective action may be taken. According to some embodiments, value ("V1") 1324 at time 1334 may be described as a "half-life" value (e.g., duration 1334 in which an amount of time elapses such that an electronic message and its contents, such as a brand promotion, has a value that reaches one-half of an average value of engagement). The above-described performance criteria are examples and are not intended to be limiting. Thus, monitor performance metric 1310 may be monitored or compared against any performance or time-related criteria.

Figure 14:
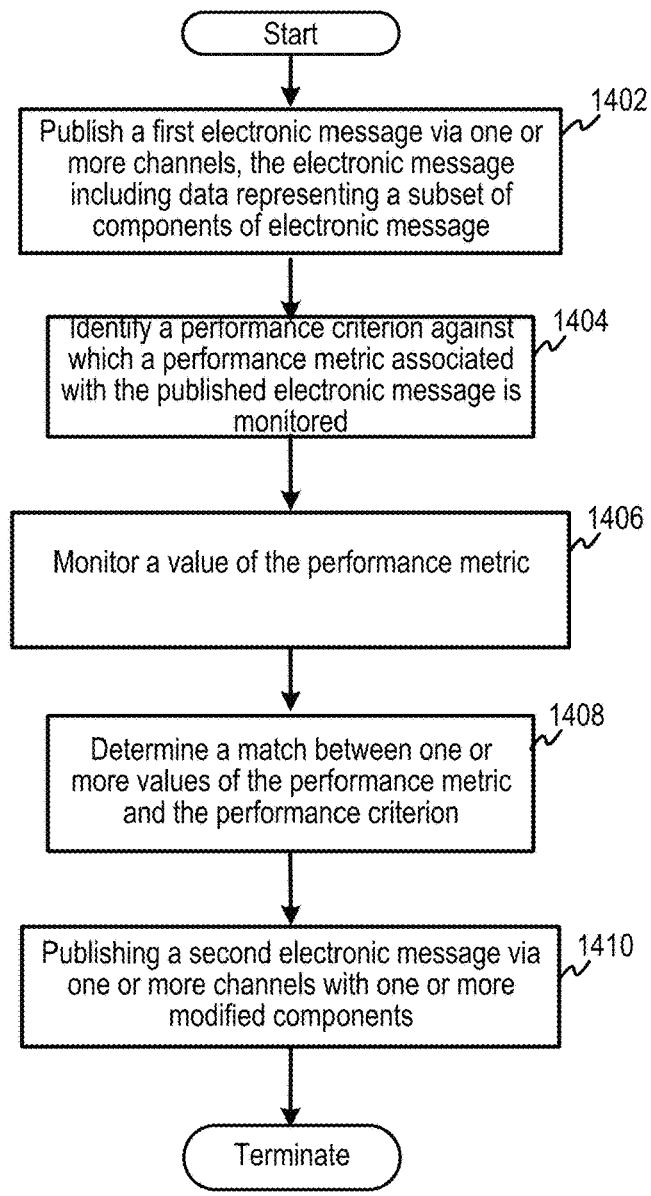
FIG. 14 is a flow diagram as an example of monitoring whether performance of an electronic message complies with predicted performance criteria, according to some embodiments.

FIG. 14 is a flow diagram as an example of monitoring whether performance of an electronic message complies with predicted performance criteria, according to some embodiments. Flow 1400 may begin at 1402, whereby an electronic message may be published via one or more channels (e.g., various social networking platforms). The electronic message may include data representing a subset of components of electronic message. At 1404, a performance criterion is identified against which a performance metric associated with the published electronic message may be monitored. A performance criterion may include one or more time-based criteria values during which to, for example, deactivate the first electronic message or activate a second electronic message (e.g., a time-related criterion triggers corrective action). A performance criterion may include one or more performance-based criteria values during which to activate the second electronic message (e.g., a performance-related criterion triggers corrective action).

At 1406, a value of a performance metric, such a number of impressions, may be monitored. At 1408, a match between one or more values of the performance metric and the performance criterion may be determined, thereby identifying, for example, a point in time or a value of a performance metric associated with a published electronic message that is noncompliant with performance criteria. Hence, a determination may be made to take corrective action, as well as a type of corrective action.

At 1410, another electronic message may be published via one or more channels. In some cases, this electronic message may be a new message or may be based on an earlier message with one or more modified components. A monitored point of time may be matched to one of the one or more time-based criteria values to initiate activation of a second electronic message. Also, a monitored performance metric value may be determined to match one or more performance-based criteria values, which may be defined as triggers to activate publishing of a second electronic message.

Figure 15:
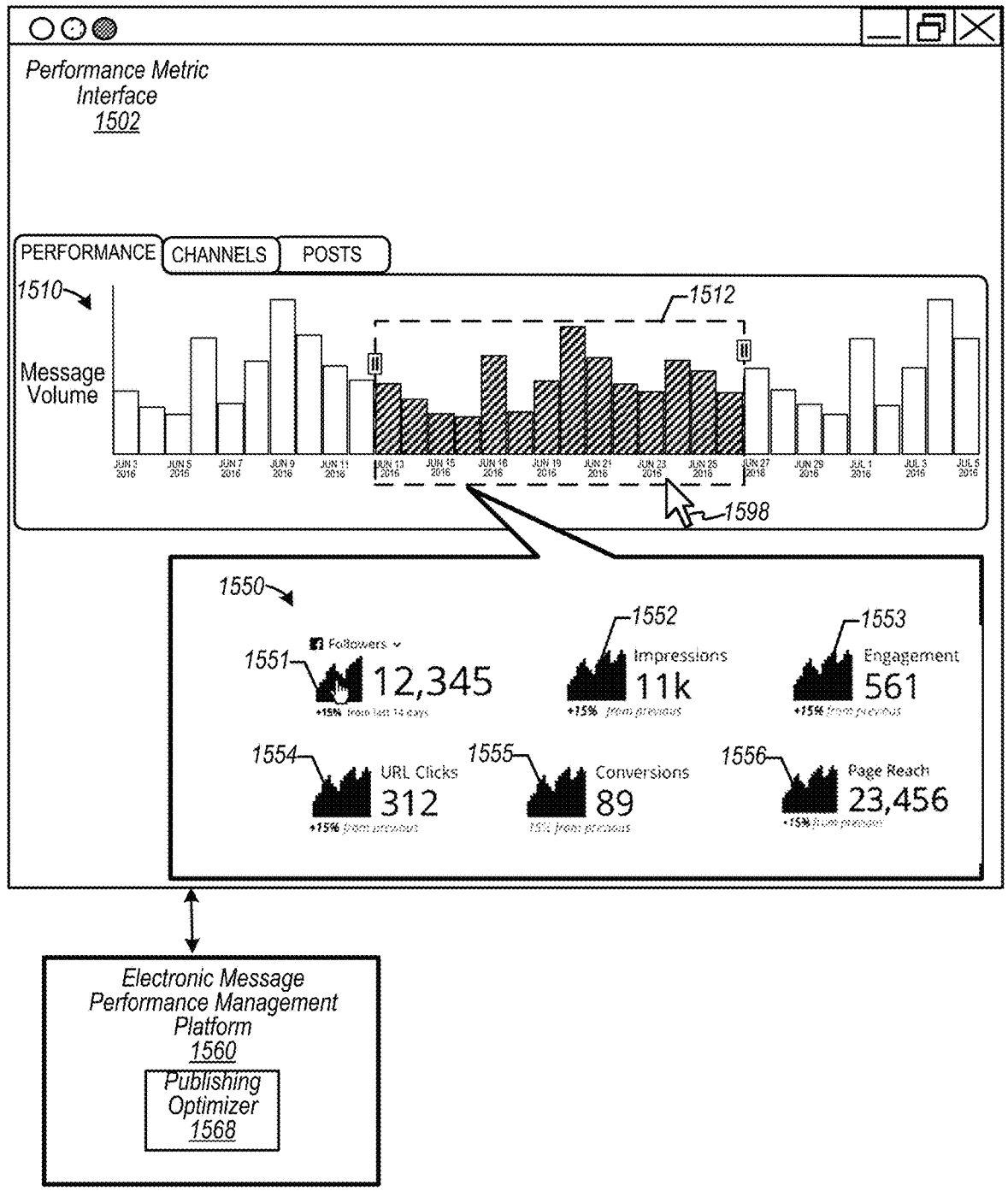
FIG. 15 is a diagram depicting an electronic message performance management platform implementing a publishing optimizer configured to present monitored performance values of a published electronic message, according to some embodiments.

FIG. 15 is a diagram depicting an electronic message performance management platform implementing a publishing optimizer configured to present monitored performance values of a published electronic message, according to some embodiments. Diagram 1500 includes an electronic message performance management platform 1560 that includes a publishing optimizer 1568, which may be present a performance metric interface 1502. As shown, performance metric interface 1502 may present monitored performance metrics, such as message volume 1510 during one or more windows of time 1512. In at least some cases, a user may implement a user input selector 1598 to cause publishing optimizer 1568 to present a more granular view of performance metrics 1550 during window of time 1512. As shown, performance metric interface 1502 may present values and visual indicators for a number of followers 1551, a number of impressions 1552, an amount of engagement 1553, a number of URL clicks 1554, a number of conversions 1555, a number of pages reached 1556, and the like. Performance metric interface 1502 may be viewed as computerized tool with which to monitor performance levels of published electronic messages and content to determine whether the messages and content are performing as expected to relative to performance criteria. In some examples, performance management platform 1560 may be configured to automatically perform corrective actions to calibrate content of one or more electronic messages to one or more sets of performance criteria.

Figure 16:
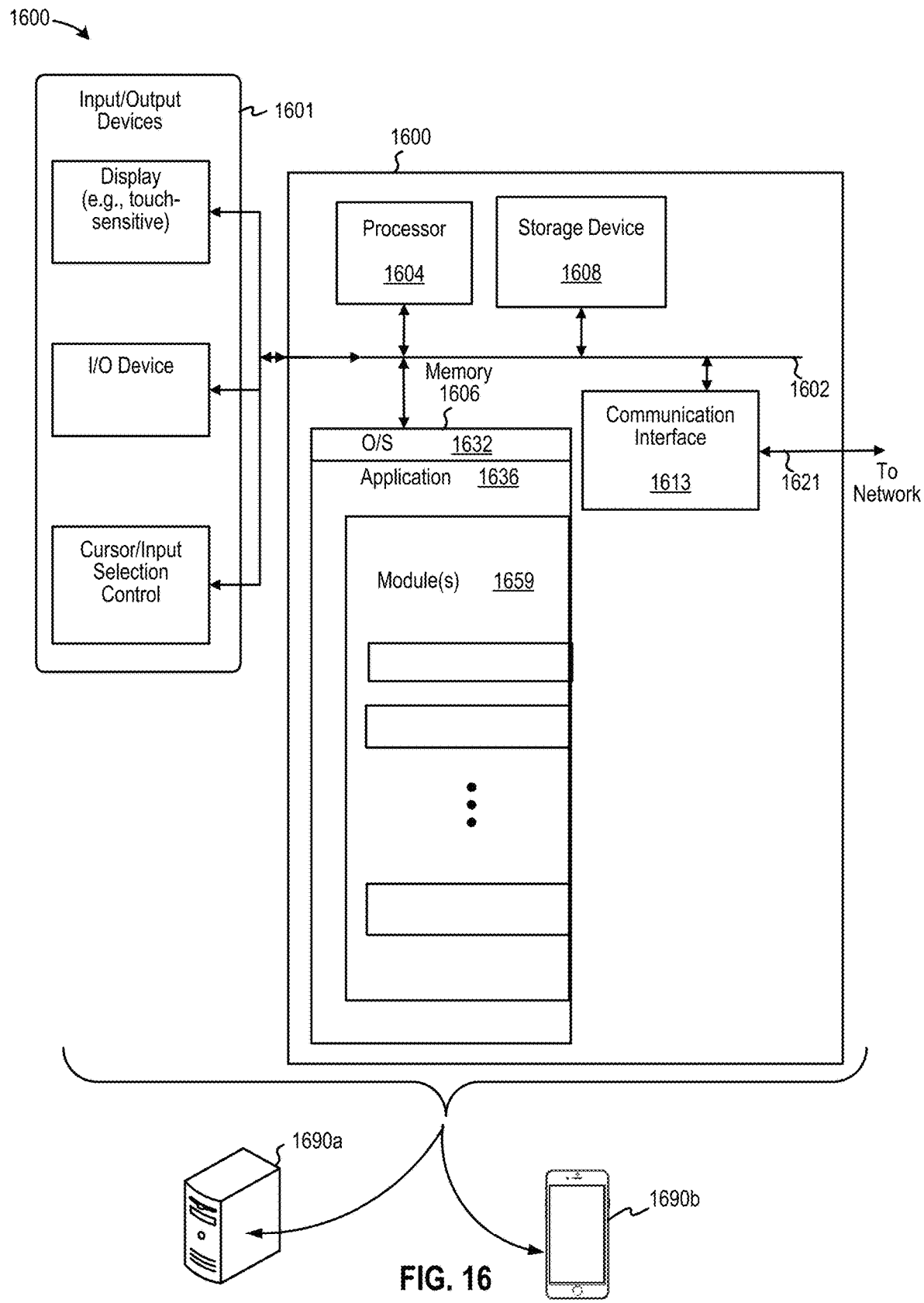
FIG. 16 illustrates examples of various computing platforms configured to provide various functionalities to components of an electronic message performance management platform, according to various embodiments.

FIG. 16 illustrates examples of various computing platforms configured to provide various functionalities to components of an electronic message performance management platform 1600, which may be used to implement computer programs, applications, methods, processes, algorithms, or other software, as well as any hardware implementation thereof, to perform the above-described techniques.

In some cases, computing platform 1600 or any portion (e.g., any structural or functional portion) can be disposed in any device, such as a computing device 1690a, mobile computing device 1690b, and/or a processing circuit in association with initiating any of the functionalities described herein, via user interfaces and user interface elements, according to various examples.

Computing platform 1600 includes a bus 1602 or other communication mechanism for communicating information, which interconnects subsystems and devices, such as processor 1604, system memory 1606 (e.g., RAM, etc.), storage device 1608 (e.g., ROM, etc.), an in-memory cache (which may be implemented in RAM 1606 or other portions of computing platform 1600), a communication interface 1613 (e.g., an Ethernet or wireless controller, a Bluetooth controller, NFC logic, etc.) to facilitate communications via a port on communication link 1621 to communicate, for example, with a computing device, including mobile computing and/or communication devices with processors, including database devices (e.g., storage devices configured to store atomized datasets, including, but not limited to triplestores, etc.). Processor 1604 can be implemented as one or more graphics processing units ("GPUs"), as one or more central processing units ("CPUs"), such as those manufactured by Intel® Corporation, or as one or more virtual processors, as well as any combination of CPUs and virtual processors. Computing platform 1600 exchanges data representing inputs and outputs via input-and-output devices 1601, including, but not limited to, keyboards, mice, audio inputs (e.g., speech-to-text driven devices), user interfaces, displays, monitors, cursors, touch-sensitive displays, LCD or LED displays, and other I/O-related devices.

Note that in some examples, input-and-output devices 1601 may be implemented as, or otherwise substituted with, a user interface in a computing device associated with, for example, a user account identifier in accordance with the various examples described herein.

According to some examples, computing platform 1600 performs specific operations by processor 1604 executing one or more sequences of one or more instructions stored in system memory 1606, and computing platform 1600 can be implemented in a client-server arrangement, peer-to-peer arrangement, or as any mobile computing device, including smart phones and the like. Such instructions or data may be read into system memory 1606 from another computer readable medium, such as storage device 1608. In some examples, hard-wired circuitry may be used in place of or in combination with software instructions for implementation. Instructions may be embedded in software or firmware. The term "computer readable medium" refers to any tangible medium that participates in providing instructions to processor 1604 for execution. Such a medium may take many forms, including but not limited to, non-volatile media and volatile media. Non-volatile media includes, for example, optical or magnetic disks and the like. Volatile media includes dynamic memory, such as system memory 1606.

Known forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can access data. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 1602 for transmitting a computer data signal.

In some examples, execution of the sequences of instructions may be performed by computing platform 1600. According to some examples, computing platform 1600 can be coupled by communication link 1621 (e.g., a wired network, such as LAN, PSTN, or any wireless network, including WiFi of various standards and protocols, Bluetooth®, NFC, Zig-Bee, etc.) to any other processor to perform the sequence of instructions in coordination with (or asynchronous to) one another. Computing platform 1600 may transmit and receive messages, data, and instructions, including program code (e.g., application code) through communication link 1621 and communication interface 1613. Received program code may be executed by processor 1604 as it is received, and/or stored in memory 1606 or other non-volatile storage for later execution.

In the example shown, system memory 1606 can include various modules that include executable instructions to implement functionalities described herein. System memory 1606 may include an operating system ("O/S") 1632, as well as an application 1636 and/or logic module(s) 1659. In the example shown in FIG. 16, system memory 1606 may include any number of modules 1659, any of which, or one or more portions of which, can be configured to facilitate any one or more components of a computing system (e.g., a client computing system, a server computing system, etc.) by implementing one or more functions described herein.

The structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, modules 1659 of FIG. 16, or one or more of their components, or any process or device described herein, can be in communication (e.g., wired or wirelessly) with a mobile device, such as a mobile phone or computing device, or can be disposed therein.

In some cases, a mobile device, or any networked computing device (not shown) in communication with one or more modules 1659 or one or more of its/their components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figures can represent one or more algorithms. Or, at least one of the elements can represent a portion of logic including a portion of hardware configured to provide constituent structures and/or functionalities.

For example, modules 1659 or one or more of its/their components, or any process or device described herein, can be implemented in one or more computing devices (i.e., any mobile computing device, such as a wearable device, such as a hat or headband, or mobile phone, whether worn or carried) that include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit. For example, modules 1659 or one or more of its/their components, or any process or device described herein, can be implemented in one or more computing devices that include one or more circuits. Thus, at least one of the elements in the above-described figures can represent one or more components of hardware. Or, at least one of the elements can represent a portion of logic including a portion of a circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The invention claimed is:

1. A method, comprising:
receiving data signals to cause formation of an electronic message;
determining a component of the electronic message;
identifying one or more message performance criteria with which to form the electronic message;
characterizing the component to identify a component attribute;
predicting the component attribute matches at least one of the message performance criteria configured to vary over a period of time, the component attribute being used to determine engagement with the electronic message by one or more recipients of a subset of a population associated with a reading level;
modifying the electronic message to form a modified electronic message configured to enhance a rate of propagation of parallel transmissions of the modified electronic message per unit time at which the modified electronic message is conveyed as a function of the message performance criteria;

transmitting the modified electronic message via a network for presentation on user interfaces on a plurality of computing devices associated with the subset of the population associated with the reading level;
monitoring performance of one or more of message components of the modified electronic message;
determining an effectiveness of the modified electronic message is at an effectiveness value; and
invoking an action automatically in a marketing campaign in response to the effectiveness value.

2. The method of claim 1 wherein the component of the electronic message comprises one or more of a word, a topic, or a message attribute.

3. The method of claim 1, wherein a message attribute of at least one or more of message component comprises a channel type.

4. The method of claim 1, wherein a message attribute of at least one or more of message component comprises a topic.

5. The method of claim 1, wherein a message attribute of at least one or more of message component comprises a word.

6. The method of claim 1, wherein a message attribute of at least one or more of message component comprises a phrase.

7. The method of claim 1, wherein a message attribute of at least one or more of message component comprises a synonym.

8. The method of claim 1, wherein a message attribute of at least one or more of message component comprises a language.

9. The method of claim 1, wherein a message attribute of at least one or more of message component comprises the reading level, wherein the reading level is associated with a complexity value representative of a complexity level of the component.

10. The method of claim 1, wherein a message attribute of at least one or more of message component comprises a geographic location.

11. The method of claim 1, wherein a message attribute of at least one or more of message component comprises metadata.

12. The method of claim 1, wherein one or more of the data signals are analyzed by a component characterizer to determine whether a message attribute includes metadata, the metadata being used to determine an amount of engagement.

13. The method of claim 1, wherein a component characterizer is configured to evaluate metadata associated with the component attribute to determine an amount of engagement, the amount of engagement being assessed over a period of time.

14. The method of claim 1, wherein a component characterizer is configured to replace the component of the electronic message with another component if an amount of engagement is below a computed value of engagement.

15. A system, comprising:
a memory configured to store data associated with an electronic message and one or more data signals used to construct the electronic message; and
a platform configured to receive data signals to cause formation of an electronic message, to determine a component of the electronic message, to identify one or more message performance criteria with which to form the electronic message, to characterize the component to identify a component attribute, to predict the component attribute matches at least one of the message performance criteria configured to vary over a period of time, the component attribute being used to determine engagement with the electronic message by one or more recipients of a subset of a population associated with a reading level, to modify the electronic message to form a modified the electronic message to form a modified electronic message configured to enhance a rate of propagation of parallel transmissions of the modified electronic message per unit time at which the modified electronic message is conveyed as a function of the message performance criteria, to transmit the modified electronic message via a network for presentation on user interfaces on a plurality of computing devices associated with the subset of the population associated with the reading level, to monitor performance of one or more of message components of the modified electronic message, to determine an effectiveness of the modified electronic message is at an effectiveness value, and to invoke an action automatically in a marketing campaign in response to the effectiveness value.

16. The system of claim 15, wherein a performance metric value characterizer is configured to identify one or more message performance curves associated with at least one performance metric to generate an engagement value per unit time as the effectiveness value.

17. The system of claim 15, further comprising a data repository configured to store the data, the data being used by the platform to identify an alternate component for the electronic message, the alternate component being configured to comport with the message performance criteria.

18. The system of claim 15, wherein the alternate component is determined by evaluating metadata associated with the component.

19. The system of claim 15, further comprising:
generating a graphical representation of one or more predicted values of the component attribute for the electronic message; and
presenting at least one of the one or more predicted values of the component attribute as one or more performance metric values graphically represented in a user interface.

20. A non-transitory computer readable medium having one or more computer program instructions configured to perform a method, the method comprising:
receiving data signals to cause formation of an electronic message;
determining a component of the electronic message;
identifying one or more message performance criteria with which to form the electronic message;
characterizing the component to identify a component attribute;
predicting the component attribute matches at least one of the message performance criteria configured to vary over a period of time, the component attribute being used to determine engagement with the electronic message by one or more recipients of a subset of a population associated with a reading level;
modifying the electronic message to form a modified electronic message configured to enhance a rate of propagation of parallel transmissions of the modified electronic message per unit time at which the modified electronic message is conveyed as a function of the message performance criteria;
transmitting the modified electronic message via a network for presentation on user interfaces on a plurality of computing devices associated with the subset of the population associated with the reading level;
monitoring performance of one or more of message components of the modified electronic message;
determining an effectiveness of the modified electronic message is at an effectiveness value; and
invoking an action automatically in a marketing campaign in response to the effectiveness value.

\* \* \* \* \*